United States Patent
Arai

(10) Patent No.: US 8,589,699 B2
(45) Date of Patent: Nov. 19, 2013

(54) STORAGE MEDIA DEVICE AND RECORDING APPARATUS

(75) Inventor: Hideki Arai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/426,921

(22) Filed: Mar. 22, 2012

(65) Prior Publication Data

US 2012/0254626 A1    Oct. 4, 2012

(30) Foreign Application Priority Data

Mar. 30, 2011   (JP) ................. 2011-074797

(51) Int. Cl.
*G06F 12/14*    (2006.01)
*H04L 9/28*    (2006.01)
*H04L 29/06*    (2006.01)

(52) U.S. Cl.
USPC ............. 713/189; 380/28; 380/44; 348/231.1

(58) Field of Classification Search
USPC ........................................ 380/44; 348/231.1
See application file for complete search history.

(56) References Cited

U.S. PATENT DOCUMENTS 6,750,908 B1 *   6/2004   Kubo ........................ 348/231.1
2009/0052664 A1 *   2/2009   Goodman et al. .............. 380/44

FOREIGN PATENT DOCUMENTS

JP   2009-277085   11/2009

* cited by examiner

*Primary Examiner* — Shin-Hon Chen
(74) *Attorney, Agent, or Firm* — Sony Corporation

(57) ABSTRACT

A storage media device includes a user-data storage section that is capable of storing encrypted user data; a key-information storage section that is capable of storing key information for decrypting the encrypted user data; a key-information deleting section that performs electrical processing for deleting the key information stored by the key-information storage section; a first switch that is manually operated by a user to issue an instruction for operating the key-information deleting section; a battery that supplies power for operating the key-information deleting section; and a display section that displays that the key-information deletion performed by the key-information deleting section is completed.

17 Claims, 17 Drawing Sheets

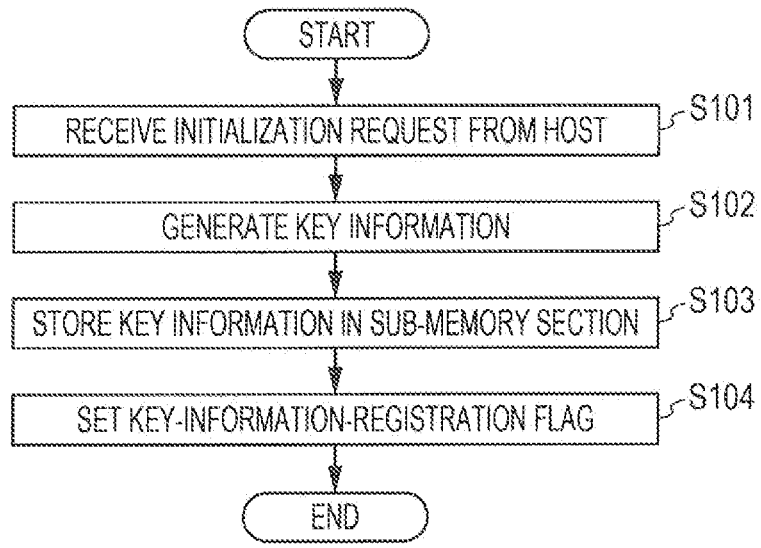
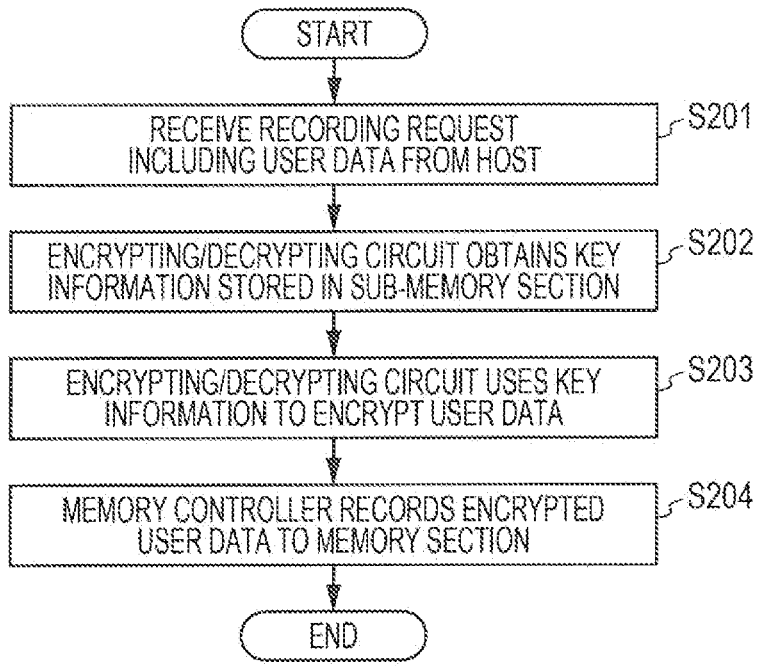

STEADY STATE

EMERGENCY STATE

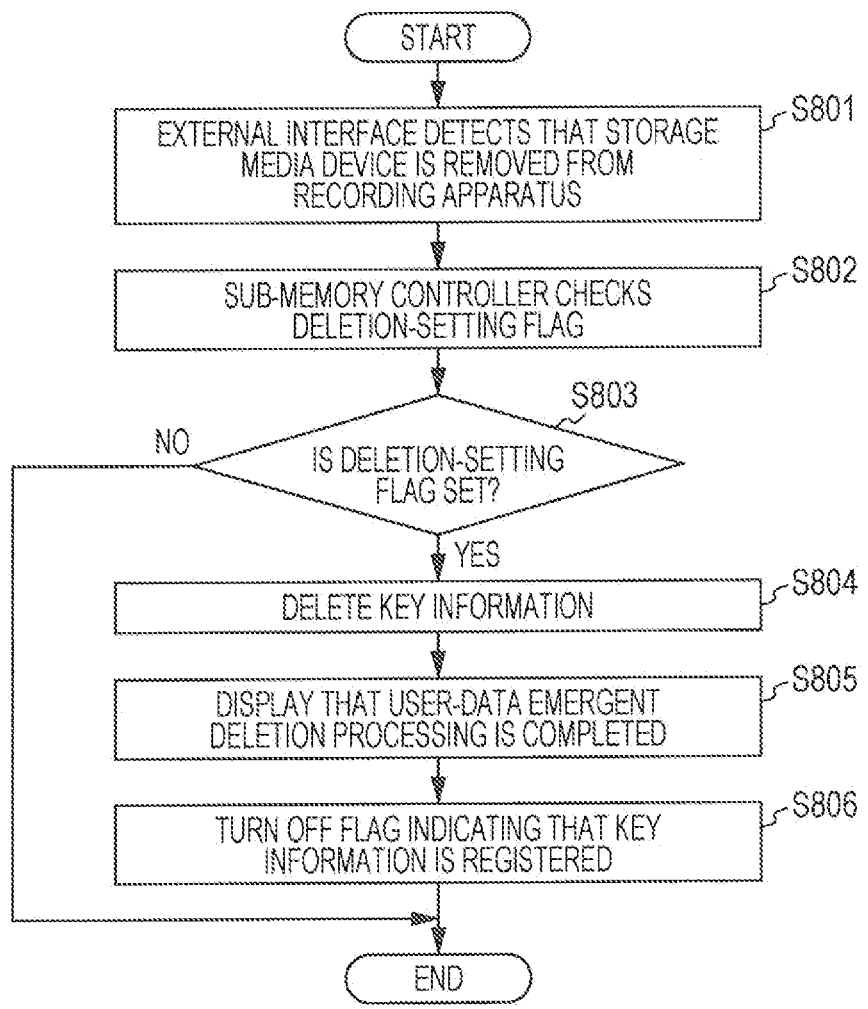

STORAGE MEDIA DEVICE AND RECORDING APPARATUS

BACKGROUND

The present technology relates to a storage media device that is capable of storing encrypted user data and a recording apparatus that supplies user data to the storage media device.

For storage media managed by a general file system, even when a recorded file is deleted according to an instruction from a user, only an index indicating the location where the actual data is recorded is deleted and the actual data still remains in the storage medium. Thus, the data could be retrieved through analysis of the storage medium. A typical method for erasing data recorded in a storage medium so that the data is unrecoverable is to overwrite the data in the storage medium with dummy data having a size that is equivalent to the capacity of the storage medium.

However, such an overwriting-based data erasing method takes a certain amount of time. Complete erasure of the user data in the storage medium in a short period of time by a simple operation is demanded, for example, in the following situations.

For example, in the field of mineral or oil-source explorations, survey data are collected at surveyed locations through various techniques. In such explorations, for example, transportations, such as an airplane and an automobile are often used, which may involve physically dangerous work. Thus, there may even a situation in which the user has to discard the storage medium in which the collected survey data are stored. In such a situation, in order to prevent leakage of the collected survey data, it is desired to provide measures that allow the user who owns the storage medium to easily and completely erase the data in the storage medium himself or herself as quickly as possible.

Examples of the storage media include magnetic tapes, HDDs (hard disk drives), and semiconductor memories, such as flash memories. In the case of magnetic tapes, application of a strong magnetic force destroys magnetic signals recorded on the media to thereby completely erase the data in the media. Recently, however, storage media employing HDDs or semiconductor memories are increasingly used because of their higher speeds, small sizes, ease of connection with other equipment, and so on.

For HDDs or semiconductor memories, it is not easy to completely erase recorded data, unlike the case of the magnetic tapes. This is because it is difficult to externally apply magnetic forces to the main bodies (i.e., magnetic disks) of the HDDs since the main bodies are accommodated in metal casings, though the HDDs are similar to the magnetic tapes in that both are magnetic media. On the other hand, semiconductor memories, such as flash memories, are not magnetically destroyed because of the structure of their storage elements.

Japanese Unexamined Patent Application Publication No. 2009-277085 discloses a technology for an information-deletion-function-equipped LSI having a circuit for erasing the contents stored in a memory. The LSI disclosed in Japanese Unexamined Patent Application Publication No. 2009-277085 has therein electricity-generating means, which generates electrical energy to operate deleting means and detecting means. Upon detecting a change in information which is caused by an external attack, the detecting means issues an instruction for deleting the contents of the memory to the deleting means and the deleting means deletes the contents in accordance with the instruction.

SUMMARY

For example, it is difficult to reliably erase data recorded in a storage medium, such as a HDD or semiconductor memory, with a simple operation in a short period of time. Accordingly, there are demands for countermeasures, for example, in applications in which an emergent situation in which a storage medium in which highly confidential data is recorded has to be hastily dumped may occur.

In view of the foregoing situations, it is desirable to provide a storage media device and a recording apparatus that are suitable for applications in which an emergent situation in which a storage medium in which highly confidential data is recorded has to be hastily dumped may occur.

In order to overcome the above-described problem, a storage media device according to an embodiment of the present technology includes: a user-data storage section that is capable of storing encrypted user data; a key-information storage section that is capable of storing key information for decrypting the encrypted user data; a key-information deleting section that performs electrical processing for deleting the key information stored by the key-information storage section; a first switch that is manually operated by a user to issue an instruction for operating the key-information deleting section; a battery that supplies power for operating the key-information deleting section; and a display section that displays that the key-information deletion performed by the key-information deleting section is completed.

According to the embodiment of the present technology, since the processing for deleting the key information for decrypting the user data can be initiated by the user's manual operation, the user data can be quickly deleted during an emergency. Additionally, since the key-information deleting section is operated with the power from the built-in battery to delete the key information, the storage media device alone can perform the deletion processing. In addition, according to the embodiment, since the completion of the deletion of the key information is displayed, it is possible to prevent a key-information-deletion failure resulting from an erroneous manual operation of the first switch.

The storage media device according to the embodiment of the present technology may further include: a data input section that inputs user data; a first encrypting section that encrypts the input user data; and a decrypting section that decrypts the user data, read from the user-data storage section, by using the key information stored by the key-information storage section.

The storage media device according to the embodiment of the present technology may further include a power-supply selecting section that determines whether or not external power is supplied and that performs, when the external power is not supplied, switching so that the power supplied by the battery is used as power for operating the key-information deleting section. With this arrangement, the power from the battery is used only when the storage-media device performs processing for deleting the key information, thus making it possible to prevent occurrence of a situation in which the key information is undeletable owing to battery depletion.

A storage media device according to another embodiment of the present technology includes: a data input section that is capable of inputting user data, a first encrypting section that encrypts the input user data, a decrypting section that decrypts encrypted user data, read from a user-data storage section, by using key information stored by a key-information storage section, and a first switch that is manually operated by a user to issue an instruction for operating a key-information deleting section; and a detachable memory unit that is integrally attachable to or is detachable from the media-device main unit and that includes the user-data storage section that is capable of storing the encrypted user data, the key-information storage section that is capable of storing the key information for decrypting the encrypted user data, the key-information deleting section that performs electrical processing for deleting the key information stored by the key-information storage section, a battery that supplies power for operating the key-information deleting section, a first detecting section that detects that the detachable memory unit is detached from the media-device main unit, to perform switching so that the power supplied by the battery is used as power for operating the key-information deleting section, and a display section that displays that the key-information deletion performed by the key-information deleting section is completed. With this arrangement, the key information can also be deleted by an operation of detaching the detachable memory section from the media-device main unit.

The storage media device according to the embodiment of the present technology may further include: a connection section that is attachable to and detachable from external equipment; a second detecting section that detects that the connection section is detached from the external equipment, to operate the key-information deleting section; and a first deletion-setting switch that is manually operated by the user to turn on or turn off the operation of the key-information deleting section on the basis of a result of the detection performed by the second detecting section. With this arrangement, by manually operating the first deletion-setting switch, the user can appropriately set whether or not to emergently delete the user data when the connection section of the storage media device is removed from the external equipment.

A recording apparatus according to yet another embodiment of the present technology includes: slot sections to which the above-described storage media devices are removably connected; a control section that supplies user data to the connected storage media devices; and a second switch that is manually operated by a user and that operates mechanically in conjunction with the first switches in the connected storage media devices. According to the recording apparatus of the embodiment of the present technology, the key information in the key-information storage sections in the storage media devices connected to the recording apparatus can be deleted at once by manual operation of the second switch of the recording apparatus.

In the recording apparatus to the embodiment of the present technology, the control section may include a second encrypting section that encrypts the user data to be supplied to the connected storage media devices. Use of the encrypting section in the recording apparatus to encrypt and decrypt the user data makes it possible to simplify the configuration of the storage media devices.

A recording apparatus according to still another embodiment of the present technology includes: slot sections to which the above-described storage media devices are removably connected; a control section that supplies user data to the connected storage media devices; and a second deletion-setting switch that is manually operated by a user and that operates mechanically in conjunction with the first deletion-setting switches in the connected storage media devices. Through operation of the second deletion-setting switch of the recording apparatus, the deletion-setting flags can be set in the multiple storage media devices at once. By turning on or off the deletion setting flag, the user can determine whether or not to emergently delete user data when the storage media device is removed from the recording apparatus, as appropriate.

As described above, the present technology can provide a storage media device and a recording apparatus that are suitable for applications in which an emergent situation in which a storage medium in which highly confidential data is recorded has to be hastily dumped may occur.

BRIEF DESCRIPTION OF THE DRAWINGS

FIG. 3 is a flowchart of initialization processing of the storage media device of the first embodiment of the present technology;

FIG. 4 is a flowchart of user-data recording processing of the storage media device of the first embodiment of the present technology;

FIG. 20 is a flowchart of user-data emergency deletion processing according to the third modification.

DETAILED DESCRIPTION OF EMBODIMENTS

Before embodiments of the present technology are described, a description will be given of a typical storage-media device related to the present technology.

<Typical Storage Media Device>

Figure 1:
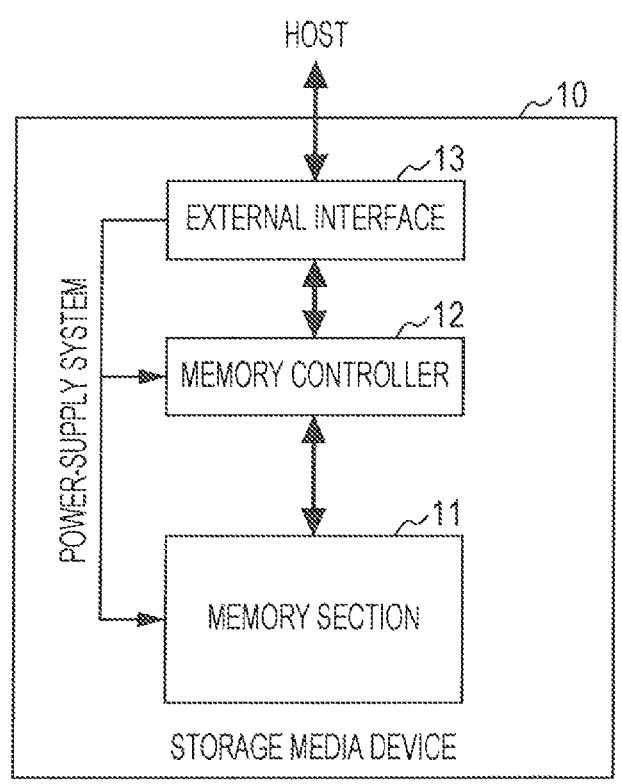
FIG. 1 is a block diagram illustrating the configuration of a typical storage media device.

FIG. 1 is a block diagram illustrating the configuration of a typical storage media device.

A typical storage media device 10 includes a memory section 11, a memory controller 12, and an external interface 13.

The memory section 11 is, for example, a HDD or a semiconductor memory, such as a flash memory.

The external interface 13 receives a reading request or a recording request from an external host or the like and passes the received request to the memory controller 12. The external interface 13 also transfers, to the host, user data that the memory controller 12 reads from the memory section 11 in response to the reading request from the host. In addition, the external interface 13 receives power supplied from the host and supplies the power to the elements in the storage media device 10.

In response to the recording request including user data to be recorded, the recording request being issued from the host and being obtained via the external interface 13, the memory controller 12 records the user data to the memory section 11. Also, in response to the reading request issued from the host and obtained via the external interface 13, the memory controller 12 reads corresponding user data from the memory section 11 and supplies the read data to the external interface 13. In addition to the functions described above, the memory controller 12 may include functions, such as wear leveling, garbage collection, compaction, error collection, and so on.

Methods for erasing user data stored on such a typical storage media device 10 can be broadly classified into the following methods:

1. Logical Destruction by Overwriting with Dummy Data

2. Physical Destruction of Memory Section 11

3. Semiconductor Electrostatic Destruction with High Voltage when Memory Section 11 is Flash Memory However, for the logical destruction (1) by overwriting with dummy data, it takes a large amount of time, since an amount of data which is equal to substantially the entire capacity of the memory section 11 is overwritten with dummy data. In addition, it takes large amounts of time and effort for connection with external equipment, such as a host, for overwriting with the dummy data. For the physical destruction (2), since a special tool has to be used, there are cases in which it is difficult to place such a heavy tool, particularly, in an airplane. The method (3) for semiconductor electrostatic destruction with a high voltage also employs dedicated equipment, and it also takes a large amount of time for the work.

Storage media devices according to embodiments of the present technology described below are aimed to overcome the problems described above.

First Embodiment

[Configuration of Storage Media Device]

Figure 2:
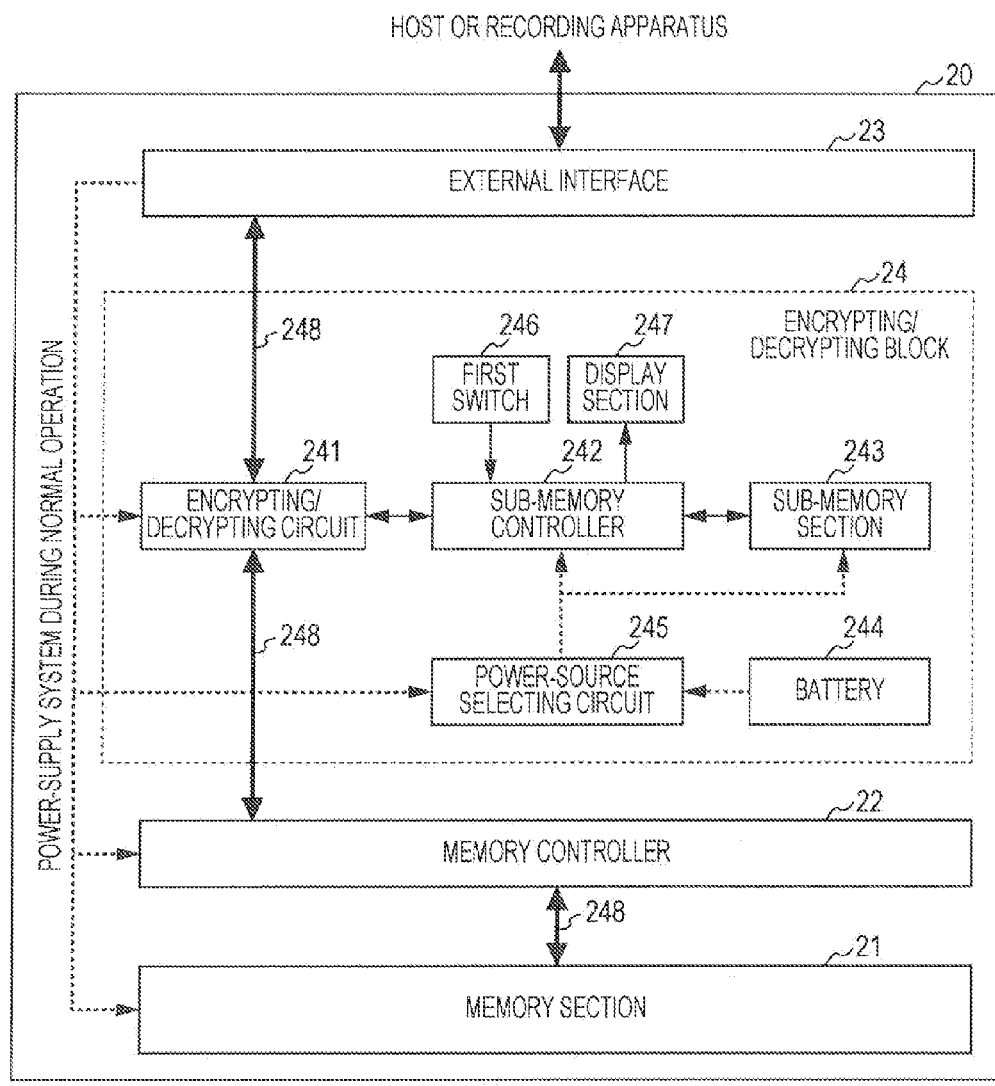
FIG. 2 is a block diagram illustrating the configuration of a storage media device according to a first embodiment of the present technology.

FIG. 2 is a block diagram illustrating the configuration of a storage media device according to a first embodiment of the present technology.

A storage media device 20 according to the first embodiment includes a memory section 21, a memory controller 22, an external interface 23, and an encrypting/decrypting block 24.

The memory section 21 (a user-data storage section), the memory controller 22, and the external interface 23 (a data input section) are substantially the same as the memory section 11, the memory controller 12, and the external interface 13 in the typical storage media device 10 described above.

The encrypting/decrypting block 24 includes an encrypting/decrypting circuit 241, a sub-memory controller 242, a sub-memory section 243, a battery 244, a power-source selecting circuit 245, a first switch 246, and a display section 247.

The encrypting/decrypting circuit 241 (a first encrypting section and a decrypting section) serves as a circuit for performing processing involving encryption and decryption of user data. The encrypting/decrypting circuit 241 is coupled between the external interface 23 and the memory controller 22 through a bus line 248. The encrypting/decrypting circuit 241 obtains a recording request including user data, the recording request being transferred from the host via the external interface 23. The encrypting/decrypting circuit 241 then encrypts the user data and supplies the encrypted user data to the memory controller 22 through the bus line 248. The encrypting/decrypting circuit 241 obtains key information, stored in the sub-memory section 243, via the sub-memory controller 242, in order to encrypt the user data. Using the key information, the encrypting/decrypting circuit 241 encrypts the user data.

Upon obtaining a reading request transferred from the host via the external interface 23, the encrypting/decrypting circuit 241 supplies the reading request to the memory controller 22. Upon receiving the reading request, the memory controller 22 reads corresponding user data from the memory section 21 and supplies the user data to the encrypting/decrypting circuit 241. Since the user data read from the memory section 21 is encrypted, the encrypting/decrypting circuit 241 obtains key information, stored in the sub-memory section 243, via the sub-memory controller 242, in order to decrypt the user data. Using the key information, the encrypting/decrypting circuit 241 decrypts the user data. The encrypting/decrypting circuit 241 supplies the decrypted user data to the external interface 23. The external interface 23 then transfers the decrypted user data to the host.

In response to a request from the encrypting/decrypting circuit 241, the sub-memory controller 242 reads key information from the sub-memory section 243 and supplies the read key information to the encrypting/decrypting circuit 241. The sub-memory controller 242 is capable of detecting a state of the first switch 246. The first switch 246 is a switch that can be manually operated by a user to change between a steady state and an emergency state for emergently deleting user data. Upon detecting that the state of the first switch 246 is changed to the emergency state for emergently erasing the user data, the sub-memory controller 242 (a key-information deleting section) performs processing for deleting the key information, which is the contents of the sub-memory section 243, in accordance with a built-in program. The sub-memory controller 242 further has a built-in program for controlling a display state of the display section 247. Upon confirming that the deletion of the contents of the sub-memory section 243 is completed, the sub-memory controller 242 changes the display state of the display section 247 to a display state indicating that the deletion of the user data is completed. For example, the sub-memory controller 242 controls the display section 247 so as to perform display in a user-recognizable form, for example, by turning on or flashing the display section 247 or changing color displayed thereon, for a certain amount of time from when the deletion of the user data is completed.

The sub-memory section 243 (a key-information storage section) is a nonvolatile storage section in which key information used for encrypting and decrypting the user data is stored. The key information may be pre-stored in the sub-memory section 243 or may be newly generated each time the storage media device 20 is initialized. The sub-memory section 243 may be any nonvolatile storage section. Specific examples include a nonvolatile semiconductor memory, such as a flash memory, and a magnetic disk. The sub-memory section 243 may have a small storage capacity that is sufficient to store key information.

In the present technology, the user-data encryption and decryption using the key information may be realized by any scheme, for example, a common-key cryptographic system or a public-key cryptographic system. For the public-key cryptographic system, since a public key is used for the encryption and a secret key is used for the decryption, the pieces of key information used for the encryption and decryption are different from each other. In the present technology, at least the key information (the decryption key) used for the decryption may be deleted in order to perform the user-data emergency deletion processing.

The battery 244 serves as a power source for supplying power that the sub-memory controller 242 uses to perform processing for deleting the contents of the sub-memory section 243, when the storage media device 20 is removed from the host or the like. The battery 244 may be implemented by a small-size battery, such as a button battery. The battery 244 may be a primary battery or a rechargeable battery.

The power-source selecting circuit 245 (a power-source selecting section) serves to switch power, used by the elements in the encrypting/decrypting block 24 except the encrypting/decrypting circuit 241, between the power supplied from the battery 244 and the power supplied from the host. The power from the host is supplied to the elements in the storage media device 20 via the external interface 23. The power-source selecting circuit 245 monitors the supply state of the power from the host. The power-source selecting circuit 245 performs a switching operation so that, when the power supply from the host is on, the power supplied from the host is used by the elements in the encrypting/decrypting block 24 except the encrypting/decrypting circuit 241 and so that, when the power supply from the host is off, the power supplied from the battery 244 is used by the elements in the encrypting/decrypting block 24 except the encrypting/decrypting circuit 241.

The first switch 246 is a switch that can be manually operated by the user to change between the steady state and the emergency state for emergently deleting user data. It is desirable that the first switch 246 have a structure that is capable of preventing an erroneous operation resulting from an unintended operation and that is easily operable for an intended operation. For example, the first switch 246 may have a structure that has an openable/closable lid capable of preventing an erroneous operation or may have a structure that is operated by multiple actions.

The display section 247 is used to display, to the user, that the deletion of the contents of the sub-memory section 243 is completed. A specific example of the display section 247 is an LED (light emitting diode).

An operation of the present embodiment will be described next.

The description of the operation is given in the following order:
1-1. Initialization Processing
1-2. Operation of Recording User Data
1-3. Operation of Reading User Data
1-4. Operation of Processing for Emergently Deleting User Data

[1-1. Initialization Processing]

FIG. 3 is a flowchart of initialization processing of the storage media device 20.

Upon receiving an initialization request from the host or the like (in step S101), the external interface 23 supplies the initialization request to the encrypting/decrypting circuit 241. Upon receiving the initialization request, the encrypting/decrypting circuit 241 generates key information used for encrypting and decrypting user data (in step S102). The sub-memory controller 242 stores the key information in the sub-memory section 243 (in step S103). When the storage of the key information is completed, the encrypting/decrypting circuit 241 requests the memory controller 22 (in step S104) so as to set, at a predetermined location in the memory section 21, a key-information-registration flag indicating that the key information is registered in the storage media device 20.

The initialization processing of the storage media device 20 is triggered by, for example, the following event. Upon receiving a user-data recording request from the host, the memory controller 22 checks the key-information-registration flag. When the key-information-registration flag is not set, the storage media device 20 determines that the key information has been deleted by the user-data emergency deletion processing and issues, to the encrypting/decrypting circuit 241, a notification indicating that the initialization is to be performed. Upon receiving the notification as an initialization request, the encrypting/decrypting circuit 241 executes the initialization processing.

[1-2. Operation of Recording User Data]

FIG. 4 is a flowchart of the processing for recording user data to the storage media device 20.

The external interface 23 in the storage media device 20 receives a recording request including user data from the host (in step S201) and then supplies the recording request to the encrypting/decrypting circuit 241. Upon receiving the recording request, the encrypting/decrypting circuit 241 requests the sub-memory controller 242 so as to obtain the key information. In accordance with the request from the encrypting/decrypting circuit 241, the sub-memory controller 242 reads the key information from the sub-memory section 243 and supplies the key information to the encrypting/decrypting circuit 241 (in step S202). The encrypting/decrypting circuit 241 uses the key information to encrypt the user data (in step S203) and issues, to the memory controller 22, a request for writing the encrypted user data to the memory section 21. In accordance with the request, the memory controller 22 writes the encrypted user data to the memory section 21 (in step S204).

[1-3. Operation of Reading User Data]

Figure 5:
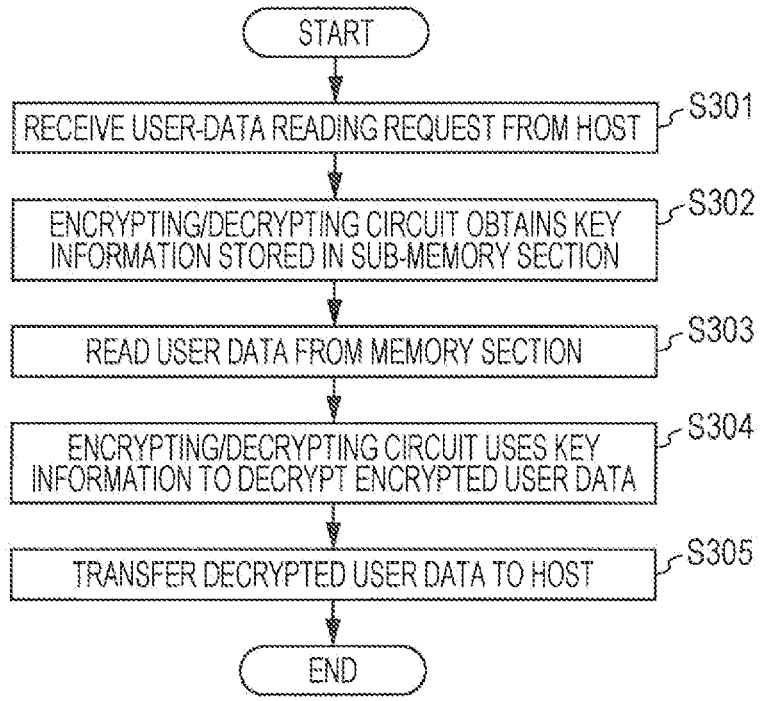
FIG. 5 is a flowchart of user-data reading processing of the storage media device of the first embodiment of the present technology.

FIG. 5 is a flowchart of the processing for reading user data from the storage media device 20.

Upon receiving a user-data reading request from the host (in step S301), the external interface 23 in the storage media device 20 supplies the reading request to the encrypting/decrypting circuit 241. Upon receiving the reading request, the encrypting/decrypting circuit 241 issues a key-information obtaining request to the sub-memory controller 242 and also issues a user-data reading request to the memory controller 22. In accordance with the request from the encrypting/decrypting circuit 241, the sub-memory controller 242 reads the key information from the sub-memory section 243 and supplies the key information to the encrypting/decrypting circuit 241 (in step S302). In response to the reading request, the memory controller 22 also reads user data from the memory section 21 and supplies the read user data to the encrypting/decrypting circuit 241 (in step S303). The encrypting/decrypting circuit 241 uses the key information to decrypt the encrypted user data read from the memory section 21 by the memory controller 22 (in step S304). The decrypted user data is transferred to the host via the external interface 23 (in step S305).

[1-4. Operation of Processing for Emergently Deleting User Data]

Next, a description will be given of an operation for emergently deleting user data stored in the memory section 21.

The description will be given on the premise that the storage media device 20 is removed from the host. In this case, the power-source selecting circuit 245 selects the power from the battery 244 as the power used by the elements in the encrypting/decrypting block 24 except the encrypting/decrypting circuit 241.

Figure 6:
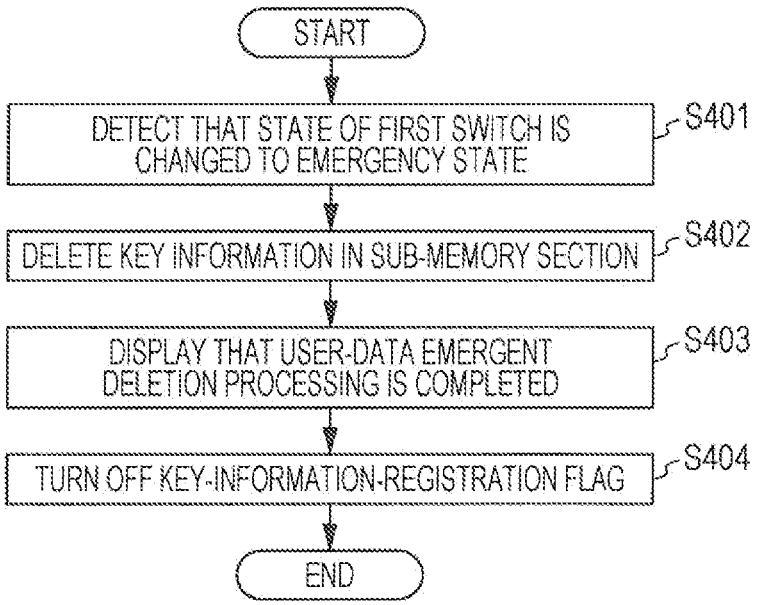
FIG. 6 is a flowchart of user-data emergency deletion processing of the storage media device of the first embodiment of the present technology.

FIG. 6 is a flowchart of the processing for emergently deleting user data.

First, the user manually operates the first switch 246 to change the state from the steady state to the emergency state. Upon detecting that the state of the first switch 246 is changed from the steady state to the emergency state (in step S401), the sub-memory controller 242 performs processing for deleting the key information in the sub-memory section 243 (in step S402). Upon completion of the processing for deleting the key information in the sub-memory section 243, the sub-memory controller 242 controls the display state of the display section 247 to visually display, to the user, that the key-information deletion, i.e., the user-data emergency deletion processing, is completed (in step S403). Lastly, the sub-memory controller 242 turns off the key-information-registration flag (in step S404). As a result of the processing described above, when user data is recorded next time, the initialization processing of the storage media device 20 is performed, so that new key information is registered.

The user may be notified of the completion of the deletion of the key information by a method using voice or motion, such as vibration, instead of the method using the display.

[Example of Key Information Deletion Processing]

An example of a method for deleting the key information in the sub-memory section 243 will now be described by way of example.

Figure 7:
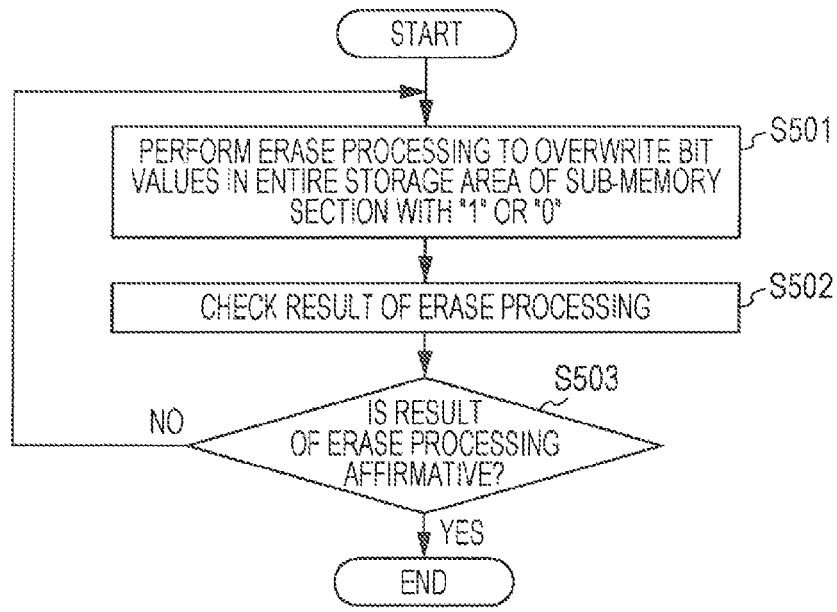
FIG. 7 is a flowchart of a first example of key-information deletion processing of the storage media device of the first embodiment of the present technology.

FIG. 7 is a flowchart illustrating a first example of the key-information deletion processing.

In step S501, the sub-memory controller 242 performs erase processing to overwrite bit values in the entire storage area of the sub-memory section 243 with "1" or "0". Subsequently, the sub-memory controller 242 determines a logical AND or logical OR of bit values in the entire storage area of the sub-memory section 243 to check the result of the erase processing (in step S502). When the erase processing is not properly performed (NO in step S503), the sub-memory controller 242 repeatedly performs the same erase processing and checking. When the erase processing is properly performed, the sub-memory controller 242 determines that the deletion of the key information is successful.

Figure 8:
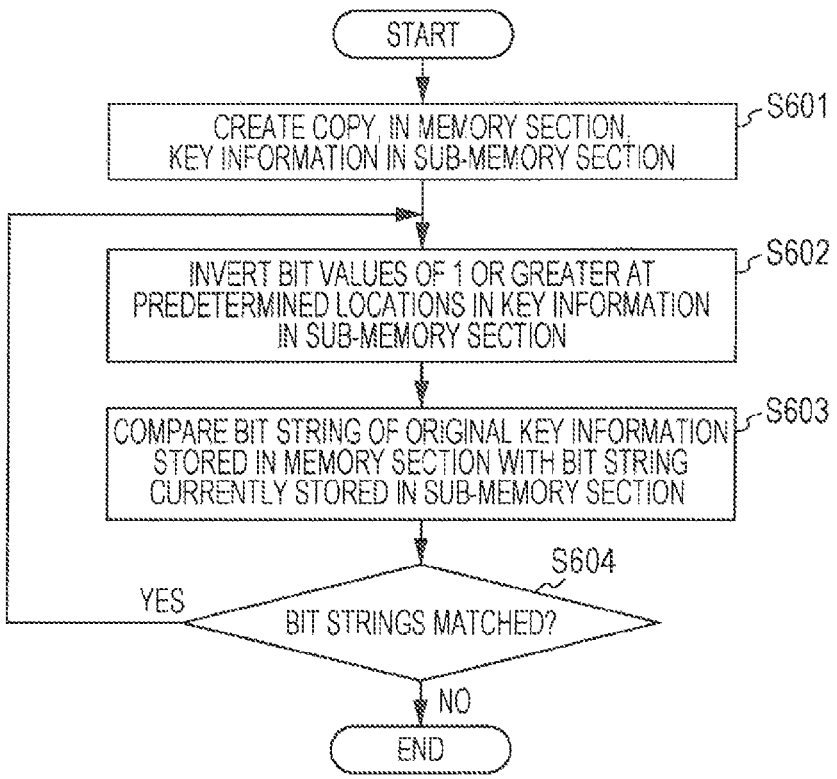
FIG. 8 is a flowchart of a second example of the key-information deletion processing of the storage media device of the first embodiment of the present technology.

FIG. 8 is a flowchart illustrating a second example of the key-information deletion processing.

This example is directed to a method that is advantageously applied to cases in which the power-source selecting circuit 245 causes the power from the battery 244 to be supplied to the sub-memory controller 242, the sub-memory section 243, the memory controller 22, and the memory section 21 when the storage media device 20 is removed from the host.

The sub-memory controller 242 requests the memory controller 22 so as to create, in the memory section 21, a copy of the key information stored in the sub-memory section 243. In step S601, in accordance with the request, the memory controller 22 records, to the memory section 21, the key information supplied by the sub-memory controller 242. Next, the sub-memory controller 242 inverts the bit values of 1 or greater at predetermined locations in the key information stored in the sub-memory section 243 (in step S602). Subsequently, the sub-memory controller 242 requests the memory controller 22 so as to transfer the key information stored in the memory section 21 and compares a bit string of the original key information with a bit string currently stored in the sub-memory section 243 (in step S603). When it is determined in step S604 that the bit strings match each other, the process returns to step S602 in which the sub-memory controller 242 performs the inversion processing once again. When it is determined in step S604 that the bit strings do not match each other, the sub-memory controller 242 determines that the deletion of the key information is successful.

The storage media device 20 according to the present embodiment is expected to provide advantages as described below.

Since the storage media device 20 deletes the key information for decrypting user data stored in the memory section 21 rather than deleting the user data itself, the user-data emergency deletion for rendering the user data unusable can be completed in a short period of time. In addition, the user data can be emergently deleted by a simple operation, i.e., a user merely manually operating the first switch 246 provided in the storage media device 20.

Upon completion of the deletion of the key information in the sub-memory section 243, the user can check for the completion via the display section 247. That is, the user can check whether or not the user-data emergency deletion is actually performed by a manual operation of the first switch 246. Thus, the reliability improves.

Second Embodiment

Next, a description will be given of a recording system 100 that includes multiple storage media devices and a recording apparatus capable of selectively supplying user data to be recorded to the storage media devices or capable of performing parallel supply of user data to be recorded thereto will be described next as a second embodiment of the present technology.

Figure 9:
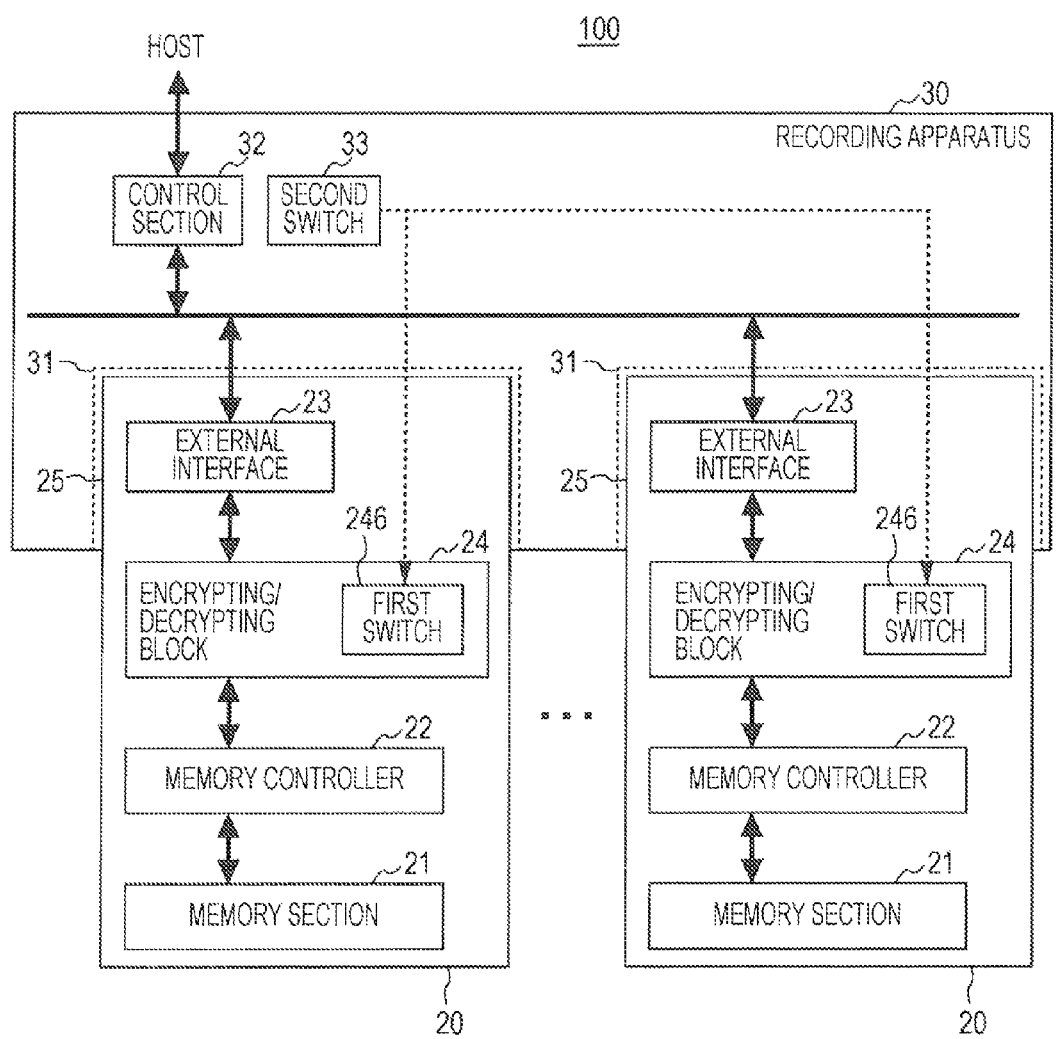
FIG. 9 is a block diagram illustrating the configuration of a recording system according to a second embodiment of the present technology.

FIG. 9 is a block diagram illustrating the configuration of the recording system 100 according to the present embodiment.

The recording system 100 includes multiple storage media devices 20 according to the first embodiment and a recording apparatus 30.

The recording apparatus 30 has multiple slot sections 31, a control section 32, and a second switch 33.

The slot sections 31 are sections to which the storage media devices 20 according to the first embodiment are mechanically and electrically connected in a removable manner.

With respect to the multiple storage media devices 20 whose connectors 25 are connected to the slot sections 31, the control section 32 performs allocation control of the storage media device(s) 20 to which user data is to be recorded or from which user data is to be read. With this arrangement, a user-data recording request or user-data reading request transferred from the host can be selectively supplied to the storage media devices 20 or can be supplied to the storage media devices 20 in parallel.

The second switch 33 is a manual switch for switching the states of the first switches 246, included in the storage media devices 20 connected to the slot sections 31, from the steady states to the emergency states at once. It is desirable that the second switch 33 have a structure that is capable of preventing an erroneous operation resulting from an unintended operation and that is easily operable for an intended operation. For example, the second switch 33 may have a structure that has an openable/closable lid capable of preventing an erroneous operation or may have a structure that is operated by multiple actions.

A change of the state of the second switch 33 is simultaneously transmitted to the first switches 246, included in the storage media devices 20 connected to the slots sections 31, via mechanical motion or the like. That is, the recording apparatus 100 is configured so that the second switch 33 provided in the recording apparatus 30 and the first switch 246 in each storage media device 20 connected to the slot section 31 change in conjunction with each other. A specific configuration will now be described by way of example.

Figure 10A:
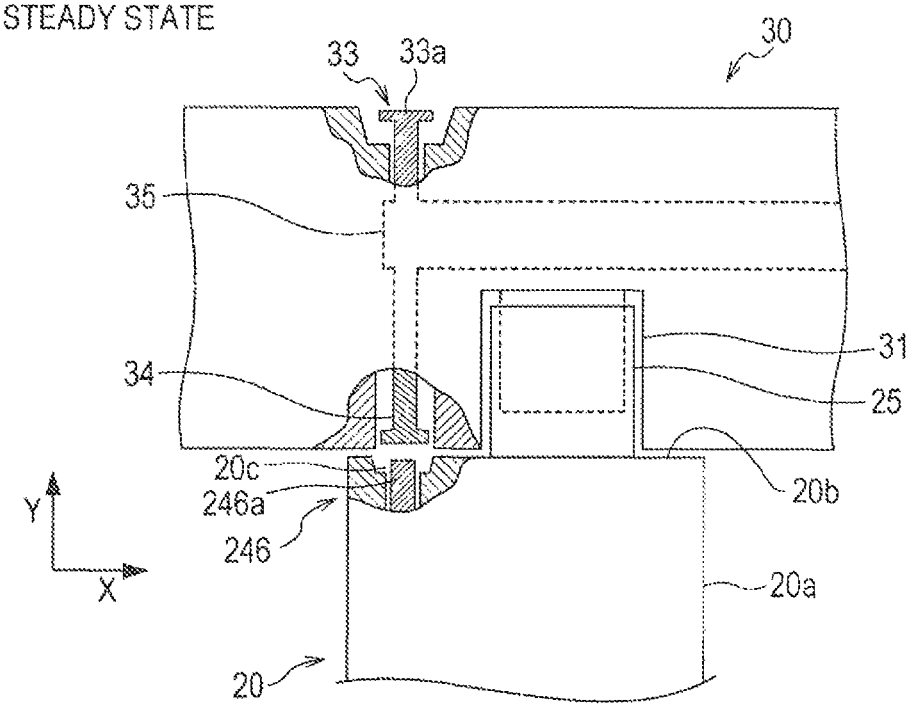
FIGS. 10A and 10B illustrate a relationship between a first switch and a second switch in the recording system of the first embodiment of the present technology.
Figure 10B:
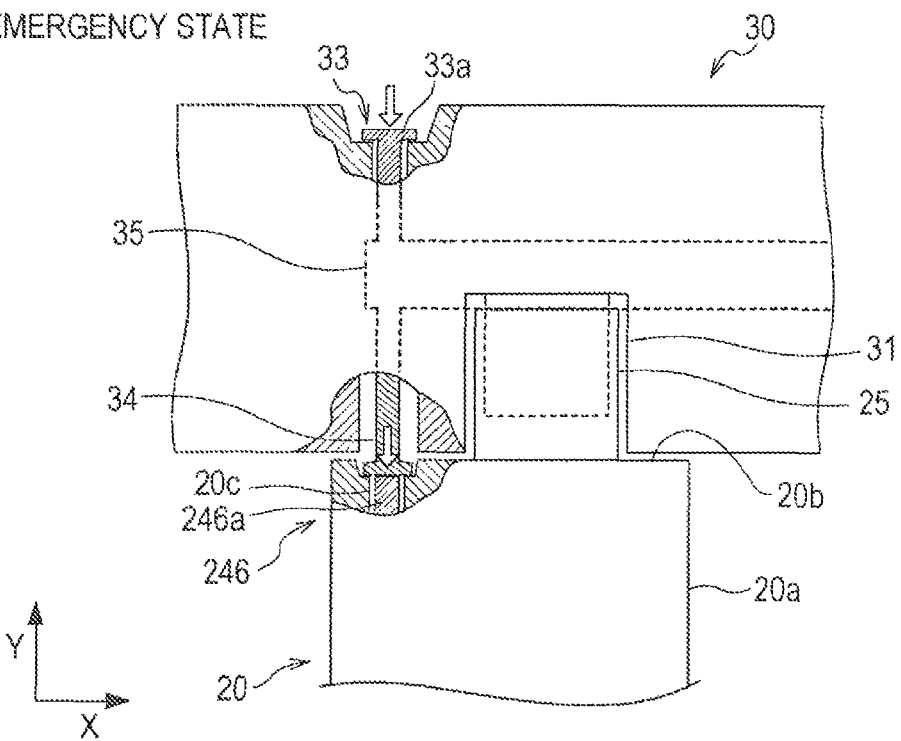

FIGS. 10A and 10B illustrate a relationship between the second switch 33 in the recording apparatus 30 and the first switch 246 in the storage media device 20 connected to one slot section 31.

In this example, the first switch 246 in the storage media device 20 is a push-button switch. A connector 25 is provided so as to protrude from a side surface 20b of a housing 20a of the storage media device 20. The connector 25 of the storage media device 20 is inserted into the slot section 31 and is electrically connected with the recording apparatus 30. A hole portion 20c that opens at the side surface 20b from which the connector 25 protrudes is provided in the housing 20a of the storage media device 20. The first switch 246 has an operation portion 246a, which is provided in the hole portion 20c. One end of the operation portion 246a is exposed at the opening of the hole portion 20c. The operation portion 246a is provided so as to be extendable and retractable in a direction (in a Y direction) in which the connector 25 of the storage media device 20 is inserted into or removed from the slot section 31 of the recording apparatus 30. The operation portion 246a is biased toward the opening of the hole portion 20c by a resilient member, such as a compressed spring. As illustrated in FIG. 10A, when the first switch 246 is in the steady state, a leading end of the operation portion 246a lies in the vicinity of a height position of the opening of the hole portion 20c.

The recording apparatus 30 has a pressing member 34 for pressing the operation portion 246a of the first switch 246 in the storage media device 20. The pressing member 34 is coupled with an operation portion 33a of the second switch 33 through a coupling mechanism 35 so that, in conjunction with an operation of the second switch 33 in the recording apparatus 30, the pressing member 34 extends or retracts in the direction (the Y direction) in which the connector 25 of the storage media device 20 is inserted into or removed from the slot section 31 of the recording apparatus 30. Similarly to the first switch 246, the second switch 33 can be manually operated to change the state from the steady state to the emergency state. Although the second switch 33 illustrated in the example in FIGS. 10A and 10B has been described as being a push-button switch, the second switch 33 may be implemented by another switch, such as a slide switch, nozzle switch, or dial switch. The first switch 246 may also be implemented by another switch.

As illustrated in FIG. 10A, when the operation portion 33a of the second switch 33 is at the position in the steady state, a leading end of the pressing member 34 is at a position away from the leading end of the operation portion 246a of the first switch 246. Thus, the first switch 246 maintains the steady state. As illustrated in FIG. 10B, when the user presses the operation portion 33a of the second switch 33, the pressing member 34 also moves in the direction in which the operation portion 33a is pressed. As a result, the leading end of the pressing member 34 makes contact with the leading end of the operation portion 246a of the first switch 246, thereby pushing the operation portion 246a of the first switch 246 into the housing 20a. When the operation portion 246a of the first switch 246 is pressed with a certain amount of pressure or larger and for a certain amount of time or more, the sub-memory controller 242 detects the event and determines that the state of the first switch 246 is changed from the steady state to the emergency state.

Although FIGS. 10A and 10B illustrate a state in which the operation portion 246a of one first switch 246 is operated by operation of the operation portion 33a of the second switch 33, the operation portion 33a of the second switch 33 is coupled with the multiple pressing members 34 (which respectively correspond to the slot sections 31) through the coupling mechanism 35. That is, when the user presses the operation portion 33a of the second switch 33, the pressing members 34 coupled with the operation portion 33a of the second switch 33 through the coupling mechanism 35 move at once in the direction in which the operation portion 33a is pressed. With this arrangement, the states of the first switches 246 connected to the slot sections 31 of the recording apparatus 30 can be changed from the steady states to the emergency states at once.

As described above, according to the recording system 100 of the second embodiment, the key information in the sub-memory sections 243 in the multiple storage media devices 20 connected to the recording apparatus 30 can be deleted at once by manual operation of the second switch 33 provided in the recording apparatus 30.

Third Embodiment

A recording system in which a recording apparatus encrypts and decrypts user data and a storage media device stores key information will be described next as a third embodiment of the present technology.

Figure 11:
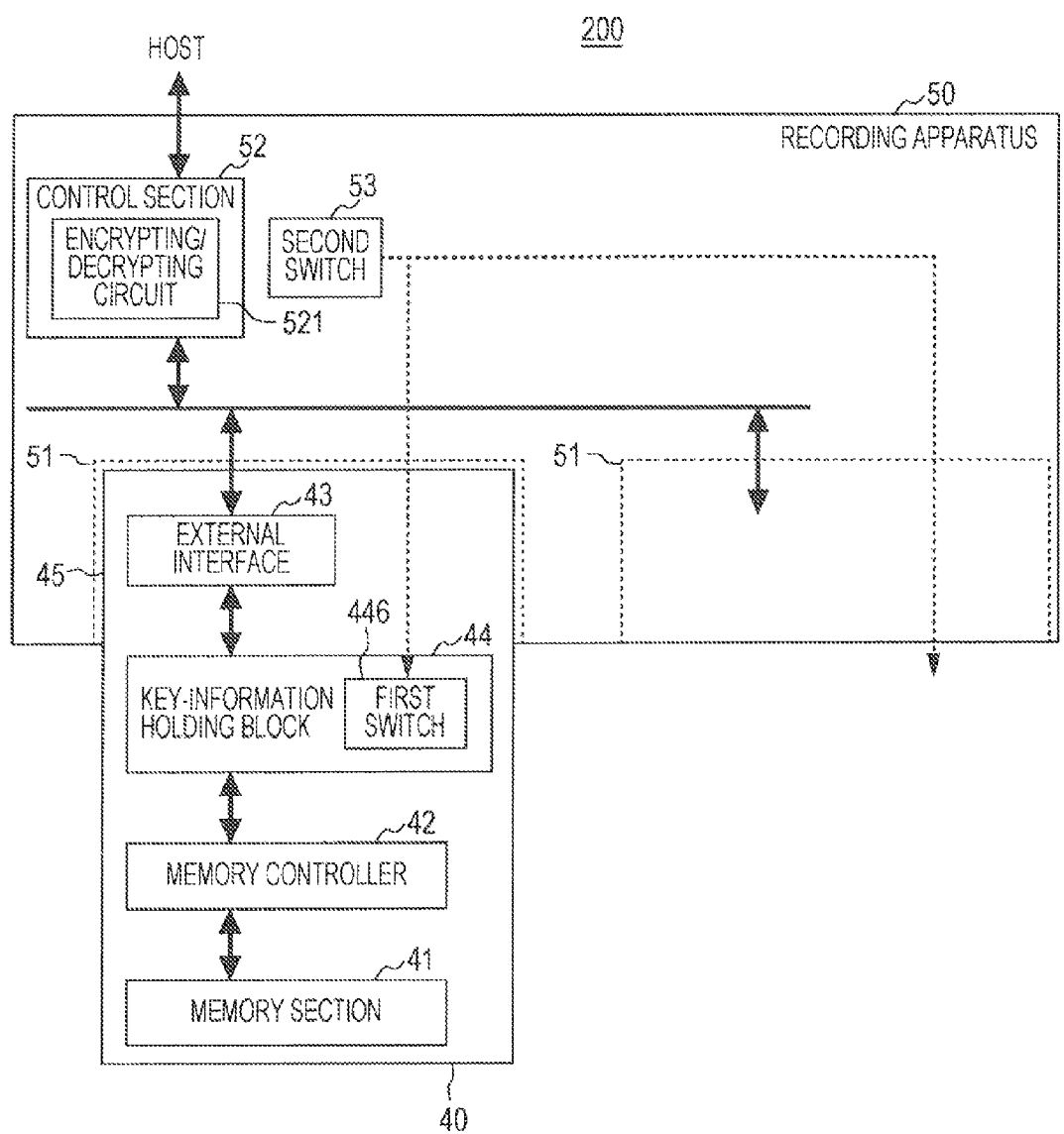
FIG. 11 is a block diagram illustrating the configuration of a recording system according to a third embodiment of the present technology.

FIG. 11 is a block diagram illustrating the configuration of a recording system 200 according to the third embodiment.

The recording system 200 of the third embodiment includes a recording apparatus 50 and one or more storage media devices 40.

The recording apparatus 50 has a configuration in which an encrypting/decrypting circuit 521 (a second encrypting section) that is capable of encrypting and decrypting user data is added to the recording apparatus 30 of the second embodiment described above. The encrypting/decrypting circuit 521 corresponds to the encrypting/decrypting circuit 241 in the encrypting/decrypting block 24 provided in each storage media device 20 of the first embodiment and the second embodiment. That is, the recording system 200 of the third embodiment has a configuration in which the encrypting/decrypting circuit is moved from the storage media device 40 to the recording apparatus 50.

Figure 12:
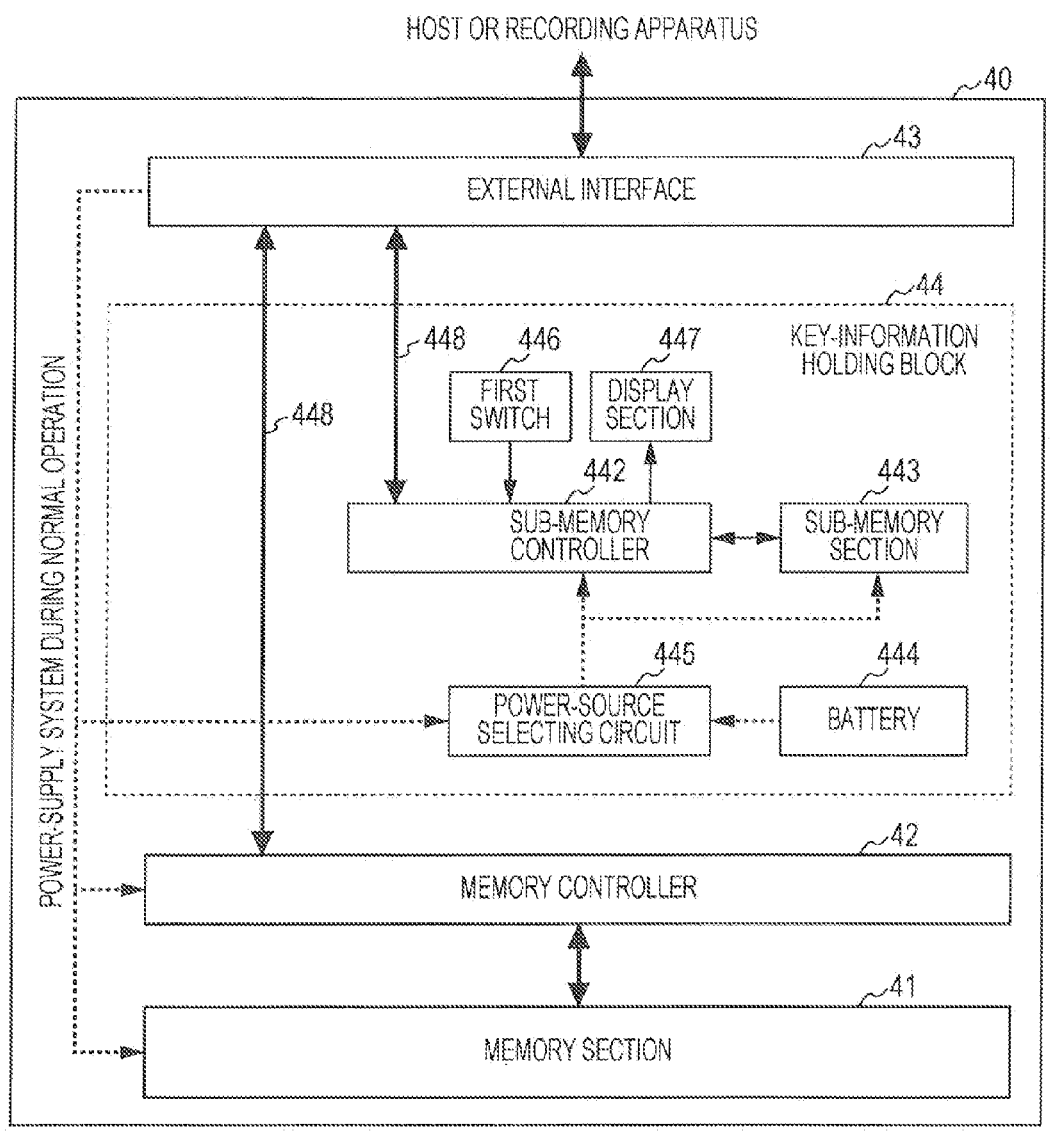
FIG. 12 is a block diagram illustrating the configuration of a storage media device in the recording system of the third embodiment of the present technology.

FIG. 12 is a block diagram illustrating the configuration of the storage media device 40 in the recording system 200 of the present embodiment.

The storage media device 40 includes a memory section 41, a memory controller 42, an external interface 43, and a key-information holding block 44. The key-information holding block 44 includes a sub-memory controller 442, a sub-memory section 443, a battery 444, a power-source selecting circuit 445, a first switch 446, and a display section 447. Since the functions of the elements other than the sub-memory controller 442 are substantially the same as those in the first embodiment, descriptions thereof are not given hereinafter.

The sub-memory controller 442 receives a key-information obtaining request from the recording apparatus 50 (or the host) via the external interface 43. Upon receiving the key-information obtaining request from the recording apparatus 50, the sub-memory controller 442 reads key information from the sub-memory section 443 and supplies the key information to the host via the external interface 43. The sub-memory controller 442 is capable of detecting a state of the first switch 446. Upon detecting that the state of the first switch 446 is changed from the steady state to the emergency state for emergently erasing the user data, the sub-memory controller 442 performs processing for deleting the key information in the sub-memory section 443 in accordance with a built-in program. The sub-memory controller 442 further has a built-in program for controlling a display state of the display section 447. Upon confirming that the deletion of the key information in the sub-memory section 443 is completed, the sub-memory controller 442 changes the display state of the display section 447 to a display state indicating that the deletion of the user data is completed.

An operation of the recording system 200 of the third embodiment will be described next.

The description of the operation is given in the following order:
3-1. Initialization Processing
3-2. Operation of Recording User Data
3-3. Operation of Reading User Data
3-4. Operation of Processing for Emergently Deleting User Data For simplification of the description of each of the operations, it is assumed that one storage media device 40 is connected to the recording apparatus 50 and the operation is performed on the storage media device 40.

[3-1. Initialization Processing]

For example, upon receiving an initialization request from the host or the like, the encrypting/decrypting circuit 521 in the recording apparatus 50 generates key information used for encrypting and decrypting user data and transfers a key-information setting request including the key information to the storage media device 40. When the storage media device 40 receives the key-information setting request from the recording apparatus 50, the external interface 43 of the storage media device 40 causes the sub-memory controller 442 in the key-information holding block 44 to store the key-information setting request in the sub-memory section 443. When the storage of the key information is completed, the sub-memory controller 442 requests the memory controller 42 so as to set, at a predetermined location in the memory section 41, a key-information-registration flag indicating that the key information is registered in the storage media device 40.

[3-2. Operation of Recording User Data]

Next, a description will be given of a case in which user data generated by an application program running on the host is to be recorded to the storage media device 40 via the recording apparatus 50.

Upon receiving a recording request including user data from the host, the encrypting/decrypting circuit 521 in the recording apparatus 50 issues a key-information obtaining request to the storage media device 40 connected to a slot section 51. The external interface 43 in the storage media device 40 passes the key-information obtaining request, issued from the encrypting/decrypting circuit 521 in the recording apparatus 50, to the sub-memory controller 442 in the key-information holding block 44. In response to the key-information obtaining request, the sub-memory controller 442 reads key information from the sub-memory section 443 and supplies the key information to the recording apparatus 50 via the external interface 43.

Upon obtaining the key information from the storage media device 40, the encrypting/decrypting circuit 521 in the recording apparatus 50 uses the key information to encrypt the user data transferred from the host. When the encryption of the user data is completed, the encrypting/decrypting circuit 521 supplies a recording request including the encrypted user data to the storage media device 40. The external interface 43 in the storage media device 40 passes the recording request including the user data, transferred from the host and encrypted, to the memory controller 42. Upon receiving the recording request including the encrypted user data, the memory controller 42 writes the encrypted user data, included in the recording request, to the memory section 41.

[3-3. Operation of Reading User Data]

Next, a description will be given of a case in which the application program running on the host issues a request for user data, stored in the storage media device 40, via the recording apparatus 50.

Upon receiving a user-data reading request from the host, the encrypting/decrypting circuit 521 in the recording apparatus 50 issues a key-information obtaining request to the storage media device 40 whose connector 45 is connected to the slot section 51. The external interface 43 in the storage media device 40 supplies the key-information obtaining request, received from the recording apparatus 50, to the sub-memory controller 442 in the key-information holding block 44. In response to the key-information obtaining request, the sub-memory controller 442 reads key information from the sub-memory section 443 and supplies the key information to the recording apparatus 50 via the external interface 43.

Subsequently, the encrypting/decrypting circuit 521 in the recording apparatus 50 issues a user-data reading request to the storage media device 40. The external interface 43 in the storage media device 40 passes the user-data reading request, issued from the recording apparatus 50, to the memory controller 42. In response to the user-data reading request, the memory controller 42 reads user data from the memory section 41 and supplies the user data to the recording apparatus 50 via the external interface 43.

The encrypting/decrypting circuit 521 in the recording apparatus 50 uses the obtained key information to decrypt the user data transferred from the storage media device 40 and transfers the decrypted user data to the host.

[3-4. Operation of Processing for Emergently Deleting User Data]

An operation for emergently deleting user data stored in the memory section 41 in the storage media device 40 of the present embodiment is substantially the same as the operation in the first embodiment or the second embodiment.

That is, the user manually operates the first switch 446 in the storage media device 40 to change the state from the steady state to the emergency state.

Upon detecting that the state of the first switch 446 is changed to the emergency state, the sub-memory controller 442 performs processing for deleting the key information in the sub-memory section 443.

Upon completion of the processing for deleting the key information in the sub-memory section 443, the sub-memory controller 442 controls the display state of the display section 447 to visually notify the user that the deletion of the key information is completed.

Alternatively, in a state in which the storage media device 40 is connected to the recording apparatus 50, the user may manually operates a second switch 53 in the recording apparatus 50 to change the state to the emergency state to thereby change the state of the first switch 446 in the storage media device 40 to the emergency state. The subsequent operations are analogous to those described above.

Alternatively, in a state in which the storage media device 40 is connected to the recording apparatus 50, the host may transmit a command for deleting the contents of the sub-memory section 443 to the storage media device 40 via the recording apparatus 50.

In such a case, the storage media device 40 supplies the deletion command, obtained via the external interface 43, to the sub-memory controller 442.

The sub-memory controller 442 interprets the obtained deletion command and deletes the contents of the sub-memory section 443.

Upon completion of the processing for deleting the contents of the sub-memory section 443, the sub-memory controller 442 controls the display state of the display section 447 to visually notify the user that the deletion of the key information is completed.

As described above, the present embodiment is expected to offer the following advantages.

Use of the encrypting/decrypting circuit 521 in the recording apparatus 50 to encrypt and decrypt the user data makes it possible to simplify the configuration of the storage media device 40. Thus, when the multiple storage media devices 40 are used to record user data, the amount of overall processing for the encryption and decryption can be reduced. In addition, since the key information for decrypting the encrypted user data stored in the memory section 41, not the encrypted user data itself stored in the memory section 41, is deleted, the user-data emergency deletion can be completed in a shorter period of time. In addition, the user-data emergency deletion can be performed by a simple operation, i.e., the user merely manually operating the first switch 446 provided in the storage media device 40 or the second switch 53 provided in the recording apparatus 50.

Fourth Embodiment

Next, a storage media device and a recording system that are configured so that the user-data encryption and decryption are performed in the recording apparatus as in the third embodiment described above and the control of the memory section and the control of the sub-memory section are performed by one memory controller will be described as a fourth embodiment of the present technology.

In the recording system of the fourth embodiment, the recording apparatus may be the recording apparatus 50 of the third embodiment and the storage media device may be configured as described below.

Figure 13:
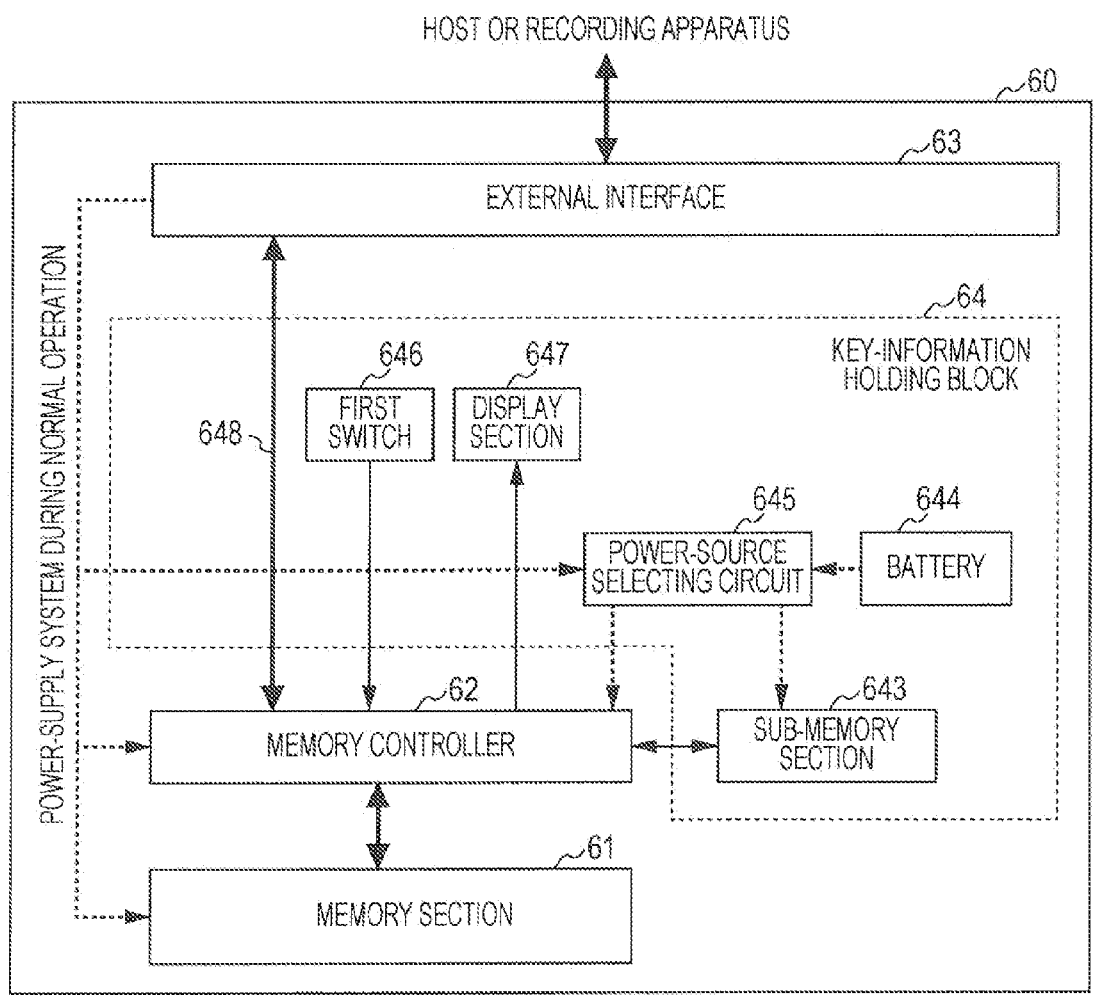
FIG. 13 is a block diagram illustrating the configuration of a storage media device according to a fourth embodiment of the present technology.

FIG. 13 is a block diagram illustrating the configuration of a storage media device 60 according to the fourth embodiment.

The storage media device 60 includes a memory section 61, a memory controller 62, an external interface 63, and a key-information holding block 64.

The key-information holding block 64 includes a sub-memory section 643, a battery 644, a power-source selecting circuit 645, a first switch 646, and a display section 647. The sub-memory section 643, the battery 644, the power-source selecting circuit 645, the first switch 646, and the display section 647 are substantially the same as those in the embodiments described above. In the present embodiment, however, a sub-memory controller dedicated to the sub-memory section 643 is not provided and the memory controller 62 is adapted to control the sub-memory section 643. The fourth embodiment is also different from the embodiments described above in that the power-source selecting circuit 645 switches the power, supplied to the elements in the key-information holding block 64 and the memory controller 62, between the power supplied from the battery 644 and the power supplied from the external equipment, i.e., the host, or the recording apparatus 50.

An operation of the fourth embodiment will be described next.

The description of the operation is given in the following order:
4-1. Initialization Processing
4-2. Operation of Recording User Data
4-3. Operation of Reading User Data
4-4. Operation of Processing for Emergently Deleting User Data For simplification of the description of each of the operations, it is assumed that one storage media device 60 is connected to the recording apparatus 50 and the operation is performed on the storage media device 60.

[4-1. Initialization Processing]

For example, upon receiving an initialization request from the host or the like, the encrypting/decrypting circuit 521 in the recording apparatus 50 generates key information used for encrypting and decrypting user data and transfers a key-information setting request including the key information to the storage media device 60. The storage media device 60 receives the key-information setting request from the recording apparatus 50 and the external interface 63 in the storage media device 60 causes the memory controller 62 to store the key-information setting request in the sub-memory section 643. When the storage of the key information is completed, the memory controller 62 sets, at a predetermined location in the memory section 61, a key-information-registration flag indicating that the key information is registered in the storage media device 60.

[4-2. Operation of Recording User Data]

Next, a description will be given of a case in which user data generated by an application program running on the host is to be recorded to the storage media device 60 via the recording apparatus 50.

Upon receiving a recording request including user data from the host, the encrypting/decrypting circuit 521 in the recording apparatus 50 issues a key-information obtaining request to the storage media device 60 connected to the slot section 51. The external interface 63 in the storage media device 60 passes the key-information obtaining request, issued from the encrypting/decrypting circuit 521 in the recording apparatus 50, to the memory controller 62. In response to the key-information obtaining request, the memory controller 62 reads key information from the sub-memory section 643 and supplies the key information to the recording apparatus 50 via the external interface 63.

Upon obtaining the key information from the storage media device 60, the encrypting/decrypting circuit 521 in the recording apparatus 50 uses the key information to encrypt the user data transferred from the host. When the encryption of the user data is completed, the encrypting/decrypting circuit 521 supplies a recording request including the encrypted user data to the storage media device 60. The external interface 63 in the storage media device 60 passes the recording request including the user data, transferred from the host and encrypted, to the memory controller 62. Upon receiving the recording request including the encrypted user data, the memory controller 62 writes the encrypted user data, included in the recording request, to the memory section 41.

[4-3. Operation of Reading User Data]

Next, a description will be given of a case in which the application program running on the host makes a request for user data, stored in the storage media device 60, via the recording apparatus 50.

Upon receiving a user-data reading request from the host, the encrypting/decrypting circuit 521 in the recording apparatus 50 issues a key-information obtaining request to the storage media device 60 connected to the slot section 51. The external interface 63 in the storage media device 60 supplies the key-information obtaining request, received from the recording apparatus 50, to the memory controller 62. In response to the key-information obtaining request, the memory controller 62 reads key information from the sub-memory section 643 and supplies the key information to the recording apparatus 50 via the external interface 63.

Subsequently, the encrypting/decrypting circuit 521 in the recording apparatus 50 issues a user-data reading request to the storage media device 60. The external interface 63 in the storage media device 60 passes the user-data reading request, issued from the recording apparatus 50, to the memory controller 62. In response to the user-data reading request, the memory controller 62 reads user data from the memory section 61 and supplies the user data to the recording apparatus 50 via the external interface 63.

The encrypting/decrypting circuit 521 in the recording apparatus 50 uses the obtained key information to decrypt the user data transferred from the storage media device 60 and transfers the decrypted user data to the host.

[4-4. Operation of Processing for Emergently Deleting User Data]

Next, a description will be given of an operation for emergently deleting user data stored in the memory section 61 in the storage media device 60 of the present embodiment.

The user manually operates the first switch 646 in the storage media device 60 to change the state from the steady state to the emergency state.

Upon detecting that the state of the first switch 646 is changed to the emergency state, the memory controller 62 performs processing for deleting the key information in the sub-memory section 643.

Upon completion of the processing for deleting the key information in the sub-memory section 643, the memory controller 62 controls the display state of the display section 647 to visually notify the user that the deletion of the key information is completed.

Alternatively, in a state in which the storage media device 60 is connected to the recording apparatus 50, the user may manually operates a second switch 53 in the recording apparatus 50 to change the state of the second switch 53 to the emergency state to thereby change the state of the first switch 646 in the storage media device 60 to the emergency state. The subsequent operations are analogous to those described above.

Alternatively, in a state in which the storage media device 60 is connected to the recording apparatus 50, the host may transmit a command for deleting the key information in the sub-memory section 643 to the storage media device 60 via the recording apparatus 50.

In such a case, the storage media device 60 supplies the obtained deletion command to the memory controller 62 via the external interface 63.

The memory controller 62 interprets the obtained deletion command and deletes the contents of the sub-memory section 643.

Upon completion of the processing for deleting the contents of the sub-memory section 643, the memory controller 62 controls the display state of the display section 647 to visually notify the user that the deletion of the key information is completed.

As described above, the present embodiment is expected to offer the following advantages.

Use of the encrypting/decrypting circuit 521 in the recording apparatus 50 to encrypt and decrypt the user data makes it possible to simplify the configuration of the storage media device 60. Thus, when the multiple storage media devices 60 are used to record user data, the amount of overall processing for the encryption and decryption can be reduced. Also, since the present embodiment has a configuration in which the control of accessing the sub-memory section 643 and the memory section 61 is performed by one memory controller 62, the processing can be more simplified. In addition, since the key information for decrypting the encrypted user data stored in the memory section 61, not the encrypted user data itself stored in the memory unit 61, is deleted, the user-data emergency deletion can be completed in a shorter period of time. In addition, the user-data emergency deletion can be performed by a simple operation, i.e., the user merely manually operating the first switch 646 provided in the storage media device 60 or the second switch 53 provided in the recording apparatus 50.

Fifth Embodiment

Next, a storage media device and a recording system that are configured so that the user-data encryption and decryption are performed in the recording apparatus as in the third embodiment described above and a specific address area in the memory section is reserved in order to store key information will be described as a fifth embodiment of the present technology.

In the recording system of the fifth embodiment, the recording apparatus may be the recording apparatus 50 of the third embodiment and the storage media device may be configured as described below.

Figure 14:
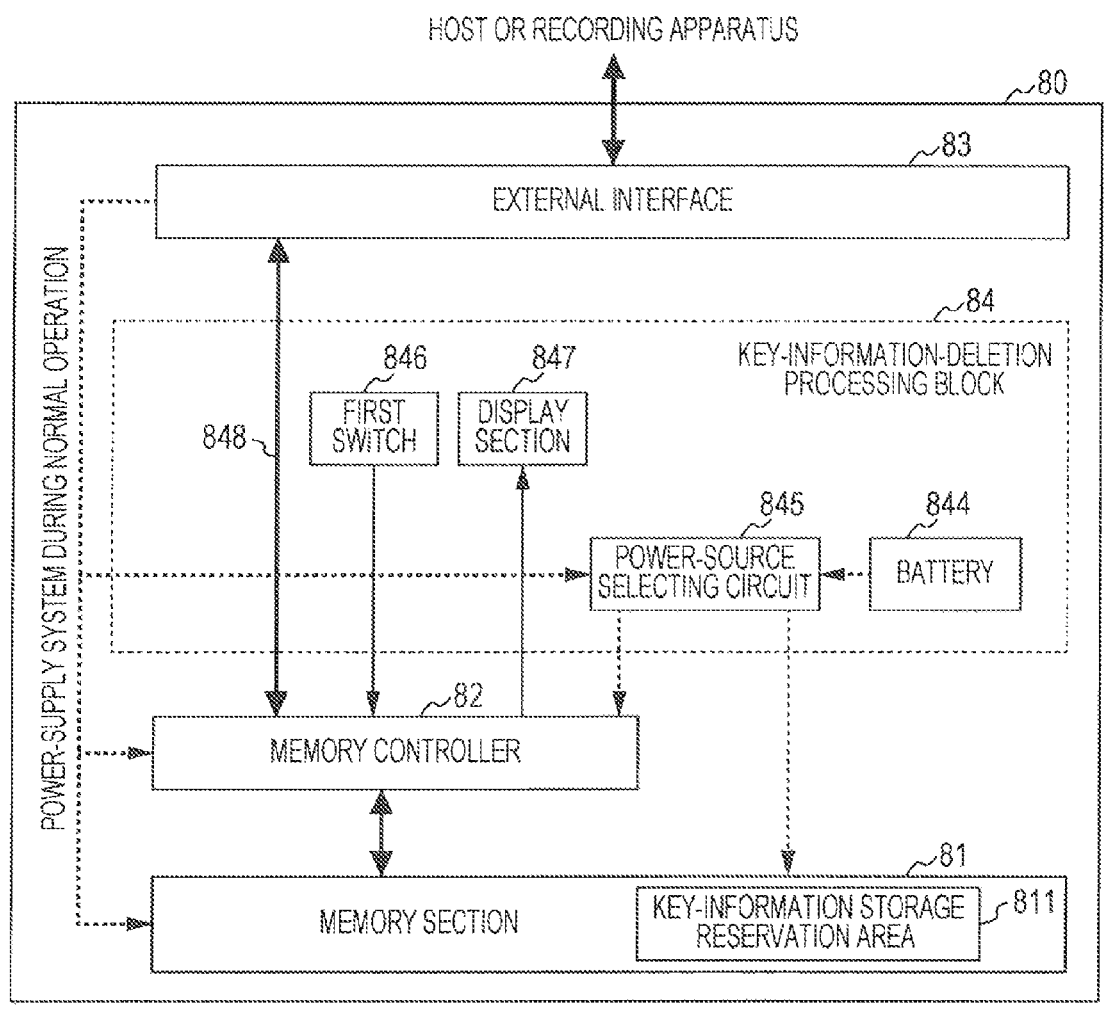
FIG. 14 is a block diagram illustrating the configuration of a storage media device according to a fifth embodiment of the present technology.

FIG. 14 is a block diagram illustrating the configuration of a storage media device 80 according to the fifth embodiment.

The storage media device 80 includes a memory section 81, a memory controller 82, an external interface 83, and a key-information-deletion processing block 84.

The key-information-deletion processing block 84 includes a battery 844, a power-source selecting circuit 845, a first switch 846, and a display section 847. The battery 844, the power-source selecting circuit 845, the first switch 846, and the display section 847 are substantially the same as those in the embodiments described above. In the present embodiment, a sub-memory section and a sub-memory controller are not provided. In the present embodiment, a predetermined address area in the memory section 81, instead of the sub-memory section, is reserved as a key-information storage reservation area 811. The power-source selecting circuit 845 switches the power, supplied to the elements in the key-information-deletion processing block 84 and the memory controller 82 and the memory section 81, between the power supplied from the battery 844 and the power supplied from the external equipment, i.e., the host, or the recording apparatus 50. The memory controller 82 controls the first switch 846 and the display section 847.

An operation of the fifth embodiment will be described next.

The description of the operation is given in the following order:
5-1. Initialization Processing
5-2. Operation of Recording User Data
5-3. Operation of Reading User Data
5-4. Operation of Processing for Emergently Deleting User Data For simplification of the description of each of the operations, it is assumed that one storage media device 80 is connected to the recording apparatus 50 and the operation is performed on the storage media device 80.

[5-1. Initialization Processing]

For example, upon receiving an initialization request from the host or the like, the encrypting/decrypting circuit 521 in the recording apparatus 50 generates key information used for encrypting and decrypting user data and transfers a key-information setting request including the key information to the storage media device 80. The storage media device 80 receives the key-information setting request from the recording apparatus 50, and the external interface 83 in the storage media device 80 supplies the key-information setting request to the memory controller 82. In accordance with the key-information setting request, the memory controller 82 stores the key information in the key-information storage reservation area 811 in the memory section 81. When the storage of the key information is completed, the memory controller 82 sets, at a predetermined location in the memory section 81, a key-information-registration flag indicating that the key information is registered in the storage media device 80.

[5-2. Operation of Recording User Data]

Next, a description will be given of a case in which user data generated by an application program running on the host is to be recorded to the storage media device 80 via the recording apparatus 50.

Upon receiving a recording request including user data from the host, the encrypting/decrypting circuit 521 in the recording apparatus 50 issues a key-information obtaining request to the storage media device 80 connected to the slot section 51. The external interface 83 in the storage media device 80 passes the key-information obtaining request, issued from the encrypting/decrypting circuit 521 in the recording apparatus 50, to the memory controller 82. In response to the key-information obtaining request, the memory controller 82 reads key information from the key-information storage reservation area 811 in the memory section 81 and supplies the key information to the recording apparatus 50 via the external interface 83.

Upon obtaining the key information from the storage media device 80, the encrypting/decrypting circuit 521 in the recording apparatus 50 uses the key information to encrypt the user data transferred from the host. When the encryption of the user data is completed, the encrypting/decrypting circuit 521 supplies a recording request including the encrypted user data to the storage media device 80. The external interface 83 in the storage media device 80 passes the recording request including the user data, transferred from the host and encrypted, to the memory controller 82. Upon receiving the recording request including the encrypted user data, the memory controller 82 writes the encrypted user data, included in the recording request, to the memory section 81.

[5-3. Operation of Reading User Data]

Next, a description will be given of a case in which the application program running on the host makes a request for user data, stored in the storage media device 80, via the recording apparatus 50.

Upon receiving a user-data reading request from the host, the encrypting/decrypting circuit 521 in the recording apparatus 50 issues a key-information obtaining request to the storage media device 80 connected to the slot section 51. The external interface 83 in the storage media device 80 supplies the key-information obtaining request, received from the recording apparatus 50, to the memory controller 82. In response to the key-information obtaining request, the memory controller 82 reads key information from the key-information storage reservation area 811 in the memory section 81 and supplies the key information to the recording apparatus 50 via the external interface 83.

Subsequently, the encrypting/decrypting circuit 521 in the recording apparatus 50 issues a user-data reading request to the storage media device 80. The external interface 83 in the storage media device 80 passes the user-data reading request, issued from the recording apparatus 50, to the memory controller 82. In response to the user-data reading request, the memory controller 82 reads user data from the memory section 81 and supplies the user data to the recording apparatus 50 via the external interface 83.

The encrypting/decrypting circuit 521 in the recording apparatus 50 uses the obtained key information to decrypt the user data transferred from the storage media device 80 and transfers the decrypted user data to the host.

[5-4. Operation of Processing for Emergently Deleting User Data]

Next, a description will be given of an operation for emergently deleting user data stored in the memory section 81 in the storage media device 80 of the present embodiment.

The user manually operates the first switch 846 in the storage media device 80 to change the state from the steady state to the emergency state.

Upon detecting that the state of the first switch 846 is changed to the emergency state, the memory controller 82 performs processing for deleting the key information in the key-information storage reservation area 811 in the memory section 81.

Upon completion of the processing for deleting the key information in the key-information storage reservation area 811 in the memory section 81, the memory controller 82 controls the display state of the display section 847 to visually notify the user that the deletion of the key information is completed.

Alternatively, in a state in which the storage media device 80 is connected to the recording apparatus 50, the user may manually operates a second switch 53 in the recording apparatus 50 to change the state of the second switch 53 to the emergency state to thereby change the state of the first switch 846 in the storage media device 80 to the emergency state. The subsequent operations are analogous to those described above.

Alternatively, in a state in which the storage media device 80 is connected to the recording apparatus 50, the host may transmit a command for deleting the key information in the key-information storage reservation area 811 in the memory section 81 to the storage media device 80 via the recording apparatus 50.

In such a case, the storage media device 80 supplies the obtained deletion command to the memory controller 82 via the external interface 83.

The memory controller 82 interprets the obtained deletion command and deletes the key information in the key-information storage reservation area 811 in the memory section 81.

Upon completion of the processing for deleting the key information in the key-information storage reservation area 811 in the memory section 81, the memory controller 82 controls the display state of the display section 847 to visually notify the user that the deletion of the key information is completed.

According to the present embodiment described above, the key information for decrypting the encrypted user data stored in the memory section 81, not the encrypted user data itself stored in the memory unit 81, is deleted from the key-information storage reservation area 811 in the memory section 81. Thus, the user-data emergency deletion processing can be reliably completed in a short period of time.

Sixth Embodiment

Next, a storage media device that can be separated into a media-device main unit and a detachable memory unit will be described as a sixth embodiment of the present technology.

Figure 15:
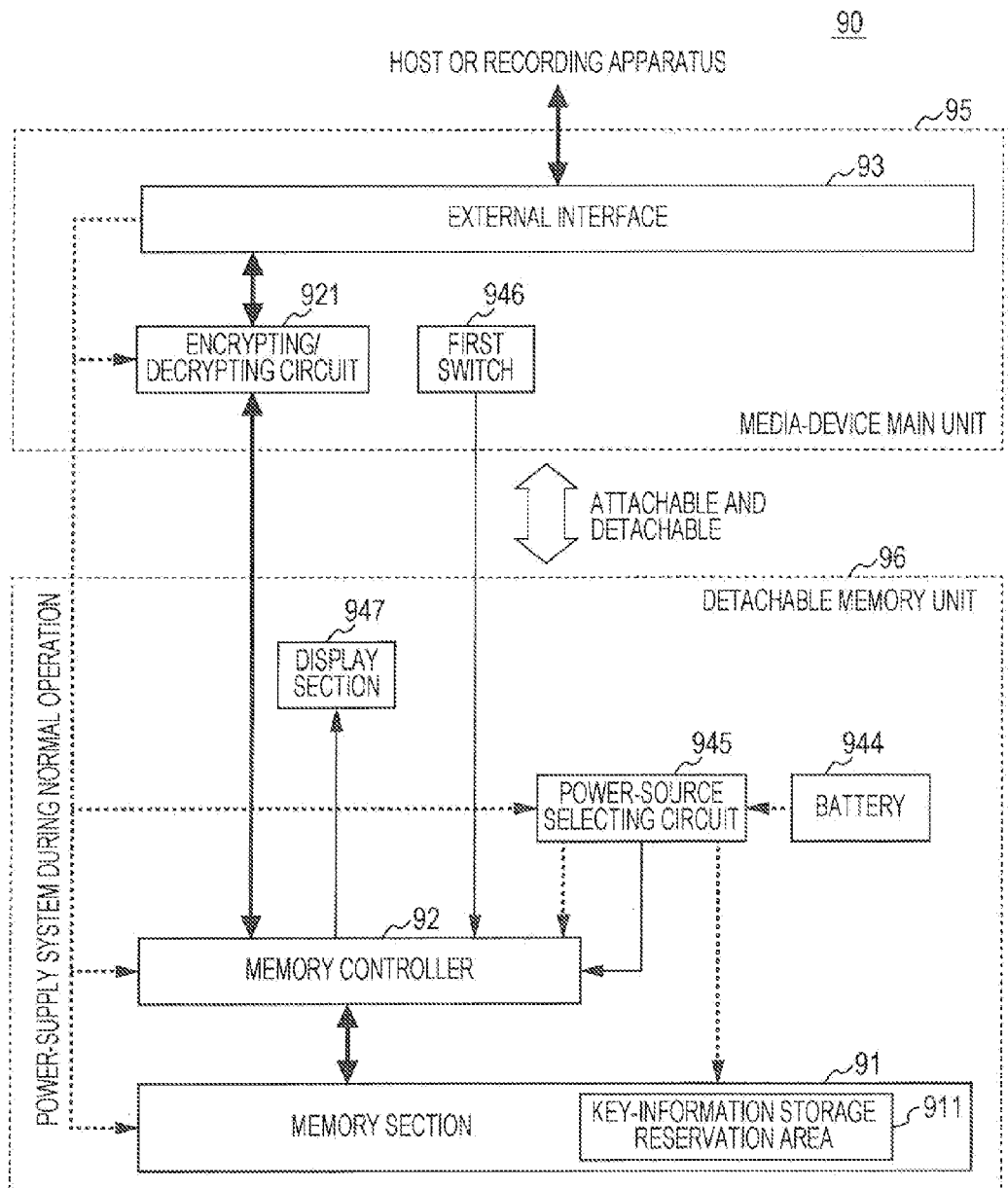
FIG. 15 is a block diagram illustrating the configuration of a storage media device according to a sixth embodiment of the present technology.

FIG. 15 is a block diagram illustrating the configuration of a storage media device 90 according to the sixth embodiment.

As illustrated in FIG. 15, the storage media device 90 includes a media-device main unit 95 and a detachable memory unit 96. The detachable memory unit 96 can be manually attached to and detached from the media-device main unit 95.

The media-device main unit 95 includes an external interface 93, a first switch 946, and an encrypting/decrypting circuit 921. These elements are substantially the same as those described in the embodiments described above.

The detachable memory unit 96 includes a memory section 91, a memory controller 92, a display section 947, a battery 944, and a power-source selecting circuit 945.

User data may be stored in the memory section 91 and key information may be stored in a predetermined key-information storage reservation area 911 in the memory section 91.

The memory controller 92 performs processing involving writing/reading user data to/from the memory section 91. The memory controller 92 performs processing involving writing/reading key information to/from the key-information storage reservation area 911 in the memory section 91. The memory controller 92 can also detect the state of connection of the detachable memory unit 96 with the media-device main unit 95. Upon detecting that the detachable memory unit 96 is detached from the media-device main unit 95, the memory controller 92 performs processing for deleting the contents of the key-information storage reservation area 911 in the memory section 91. Upon completing the deletion, the memory controller 92 switches the display state of the display section 947 to a display state indicating that the deletion of the user data is completed.

The battery 944 serves as a power source for supplying the power, used for performing processing for deleting the key information in the key-information storage reservation area 911 in the memory section 91, to the individual elements in the detachable memory unit 96 when the detachable memory unit 96 is detached from the media-device main unit 95.

The power-source selecting circuit 945 serves to switch the power, used by the individual elements in the detachable memory unit 96, between the power supplied from the battery 944 and the power supplied from the host. The power-source selecting circuit 945 monitors the supply state of the power from the host. The power-source selecting circuit 945 performs a switching operation so that, when the power supply from the host is on, the power supplied from the host is used by the elements in the detachable memory unit 96 and so that, when the power supply from the host is off, the power supplied from the battery 944 is used by the elements in the detachable memory unit 96.

An operation of the present embodiment will be described next.

The description of the operation is given in the following order:
6-1. Initialization Processing
6-2. Operation of Recording User Data
6-3. Operation of Reading User Data
6-4. Operation of Processing for Emergently Deleting User Data

[6-1. Initialization Processing]

Upon receiving an initialization request from the host or the like, the external interface 93 supplies the initialization request to the encrypting/decrypting circuit 921. Upon receiving the initialization request, the encrypting/decrypting circuit 921 generates key information used for encrypting and decrypting user data and the memory controller 92 in the detachable memory unit 96 stores the key information in the key-information storage reservation area 911 in the memory section 91. When the storage of the key information is completed, the encrypting/decrypting circuit 921 requests the memory controller 92 so as to set, at a predetermined location in the memory section 91, a key-information-registration flag indicating that the key information is registered in the storage media device 90. In accordance with the request, the memory controller 92 sets the key-information-registered fag at the predetermined location in the memory section 91.

[6-2. Operation of Recording User Data]

Upon receiving a recording request including user data from the host, the external interface 93 in the storage media device 90 supplies the recording request to the encrypting/decrypting circuit 921. Upon receiving the recording request, the encrypting/decrypting circuit 921 issues a key-information obtaining request to the memory controller 92 in the detachable memory unit 96. In accordance with the request from the encrypting/decrypting circuit 921, the memory controller 92 reads key information from the key-information storage reservation area 911 in the memory section 91 and supplies the key information to the encrypting/decrypting circuit 921. The encrypting/decrypting circuit 921 uses the key information to encrypt the user data and issues, to the memory controller 92, a request for writing the encrypted user data to the memory section 91. In accordance with the request, the memory controller 92 writes the encrypted user data to a user-data storage area (not illustrated) in the memory section 91.

[6-3. Operation of Reading User Data]

Upon receiving a user-data reading request from the host, the external interface 93 in the storage media device 90 supplies the user-data reading request to the encrypting/decrypting circuit 921. Upon receiving the user-data reading request, the encrypting/decrypting circuit 921 issues a key-information obtaining request and a user-data reading request to the memory controller 92. In accordance with the those requests, the memory controller 92 reads key information from the key-information storage reservation area 911 in the memory section 91, reads encrypted user data from the user-data storage area in the memory section 91, and supplies the read key information and encrypted user data to the encrypting/decrypting circuit 921. The encrypting/decrypting circuit 921 uses the key information to decrypt the encrypted user data read from the memory section 91 by the memory controller 92 and transfers the decrypted user data to the host via the external interface 93.

[6-4. Operation of Processing for Emergently Deleting User Data]

Next, a description will be given of an operation for emergently deleting user data stored in the memory section 91.

Figure 16:
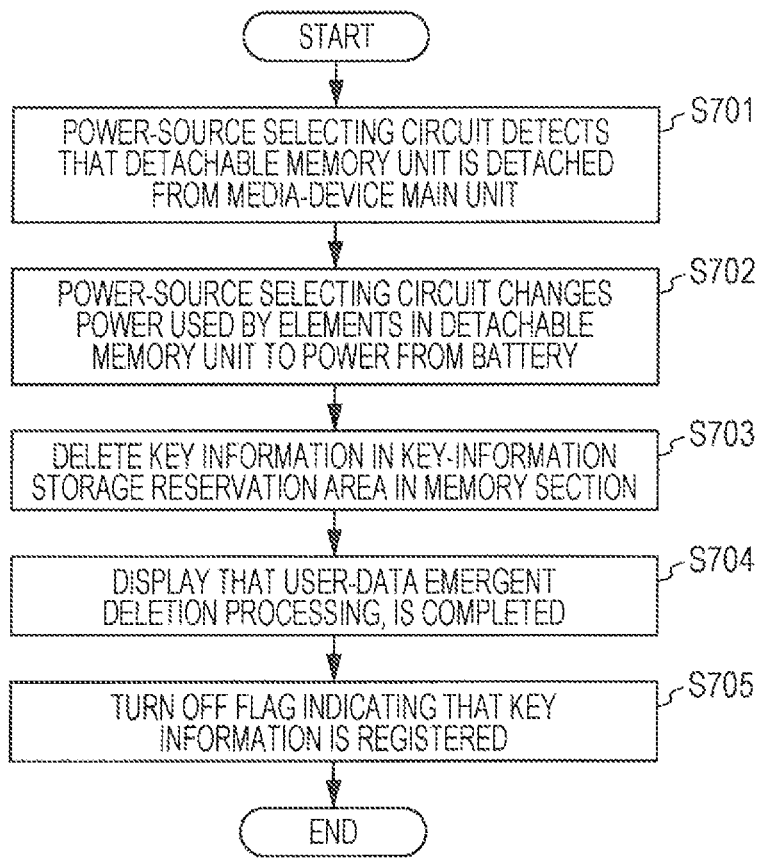
FIG. 16 is a flowchart of user-data emergency deletion processing according to the sixth embodiment of the present technology.

FIG. 16 is a flowchart of user-data emergency deletion processing according to the sixth embodiment.

When the detachable memory unit 96 is detached from the media-device main unit 95, the power-source selecting circuit 945 (a first detecting section) detects the detachment (in step S701). Thus, the power-source selecting circuit 945 performs switching so that the power from the battery 944 is used by the elements in the detachable memory unit 96 (in step S702). Thereafter, the power-source selecting circuit 945 issues, to the memory controller 92, a notification indicating that the detachable memory unit 96 is detached from the media-device main unit 95. Upon receiving the notification, the memory controller 92 performs processing for deleting the contents of the key-information storage reservation area 911 in the memory section 91 (in step S703). Upon completion of the processing for deleting the contents of the key-information storage reservation area 911 in the memory section 91, the memory controller 92 controls the display state of the display section 947 to visually display, to the user, that the key-information deletion, i.e., the user-data emergency deletion processing, is completed (in step S704). Lastly, the memory controller 92 turns off the flag indicating that the key information is registered (in step S705).

According to the storage media device 90 of the present embodiment, user data can be emergently deleted by a simple, general action of detaching the detachable memory unit 96 from the media-device main unit 95.

First Modification of Sixth Embodiment

A configuration in which a detachable memory unit having a memory section in which user data is stored and a sub-memory section in which key information is stored is detachably attached to a media-device main unit is conceivable as a first modification of the sixth embodiment. In this configuration, when the detachable memory unit is detached from the media-device main unit, the key information in the sub-memory section may also be deleted to perform the user-data emergency deletion processing.

Figure 17:
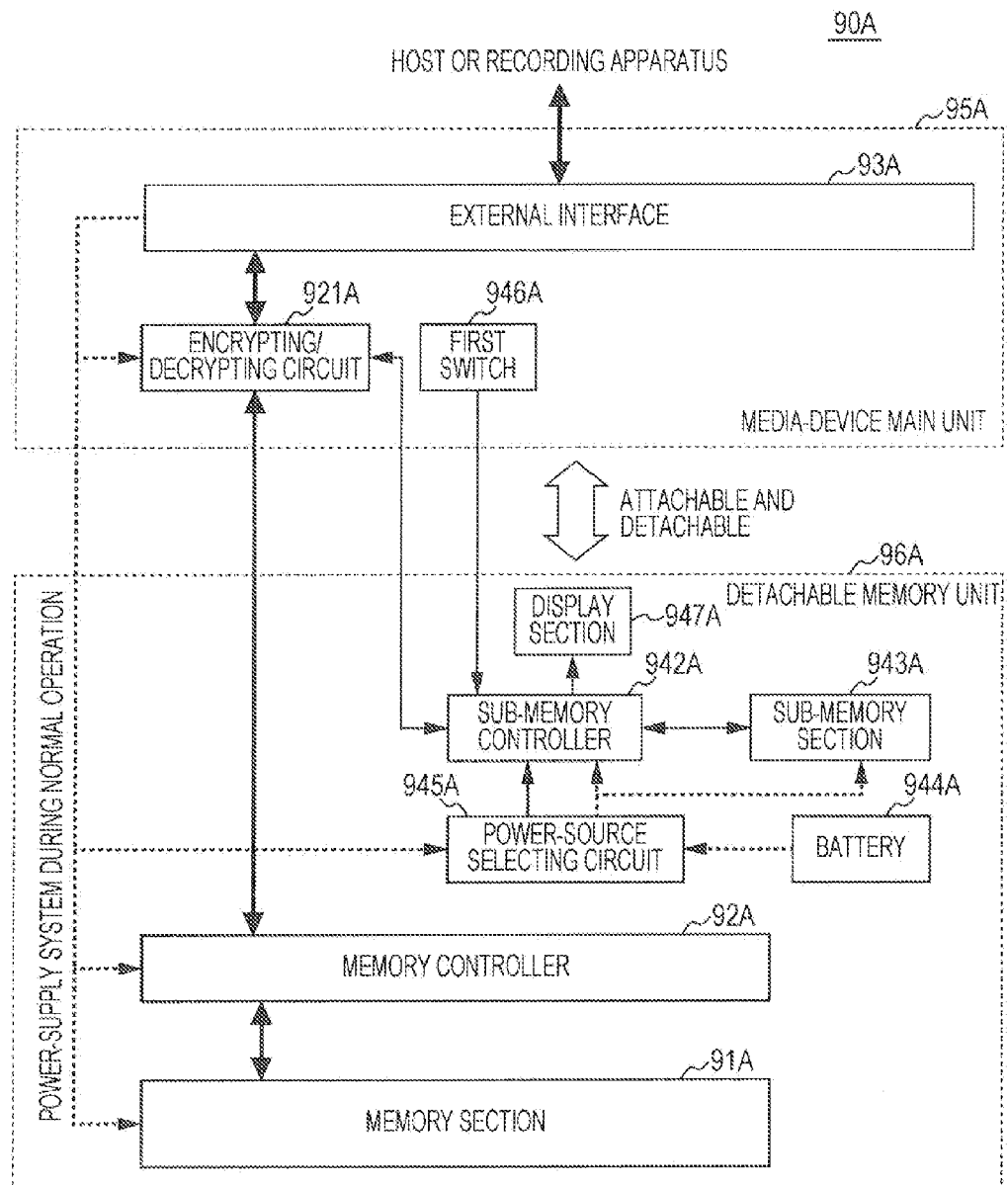
FIG. 17 is a block diagram illustrating the configuration of a storage media device according to a first embodiment of the sixth embodiment of the present technology.

FIG. 17 is a block diagram illustrating the configuration of a storage media device 90A according to the first modification. The storage media device 90A of the first modification includes a media-device main unit 95A, an external interface 93A, a first switch 946A, and an encrypting/decrypting circuit 921A. These elements are substantially the same as those described in the embodiments described above. A detachable memory unit 96A includes a memory section 91A, a memory controller 92A, a display section 947A, a battery 944A, a power-source selecting circuit 945A, a sub-memory controller 942A, and a sub-memory section 943A.

In the storage media device 90A of the first modification, when the detachable memory unit 96A is detached from the media-device main unit 95A, the power-source selecting circuit 945A detects the detachment. In response, the power-source selecting circuit 945A performs switching so that the power from the battery 944A is used by the elements in the detachable memory unit 96A. Thereafter, the power-source selecting circuit 945A issues, to the sub-memory controller 942A, a notification indicating that the detachable memory unit 96A is detached from the media-device main unit 95A. Upon receiving the notification, the sub-memory controller 942A performs processing for deleting the contents of the sub-memory section 943A. Upon completion of the processing for deleting the contents of the sub-memory section 943A, the sub-memory controller 942A controls the display state of the display section 947A to visually display, to the user, that the key-information deletion, i.e., the user-data emergency deletion processing, is completed. Lastly, the sub-memory controller 942A turns off the flag indicating that the key information is registered.

Second Modification of Sixth Embodiment

In the storage media device 90A of the sixth embodiment described above, the media-device main unit 95A has the first switch 946A. That is, when the detachable memory unit 96A is detached from the media-device main unit 95A or when the first switch 946A is changed to the emergency state, the key information is emergently deleted. As a modification of the sixth embodiment described above, a configuration in which the first switch 946A is eliminated may also be employed. In such a configuration, only when the detachable memory unit 96A is detached from the media-device main unit 95A, the key information is emergently deleted.

<Third Modification Common to Recording Systems>

Next, a function for performing key-information emergency deletion processing when the storage media device is removed from the recording apparatus will be described as a third modification that is common to the recording systems of the embodiments.

Figure 18:
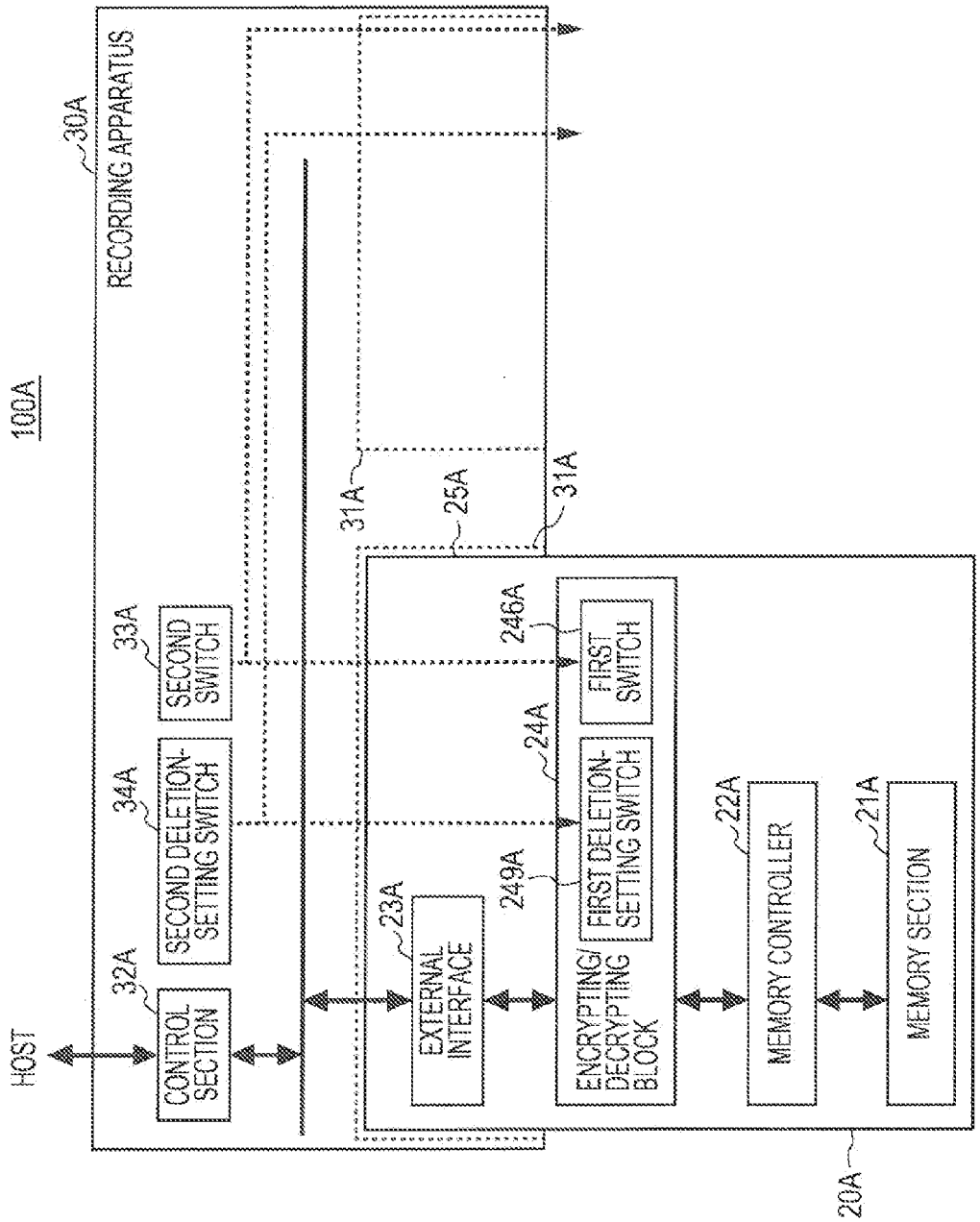
FIG. 18 is a block diagram illustrating the configuration of a recording system according to a third modification, the recording system corresponding to the recording system of the first embodiment of the present technology.

FIG. 18 is a block diagram illustrating the configuration of a recording system 100A according to the third modification, the recording system 100A corresponding to the recording system 100 of the first embodiment described above.

Figure 19:
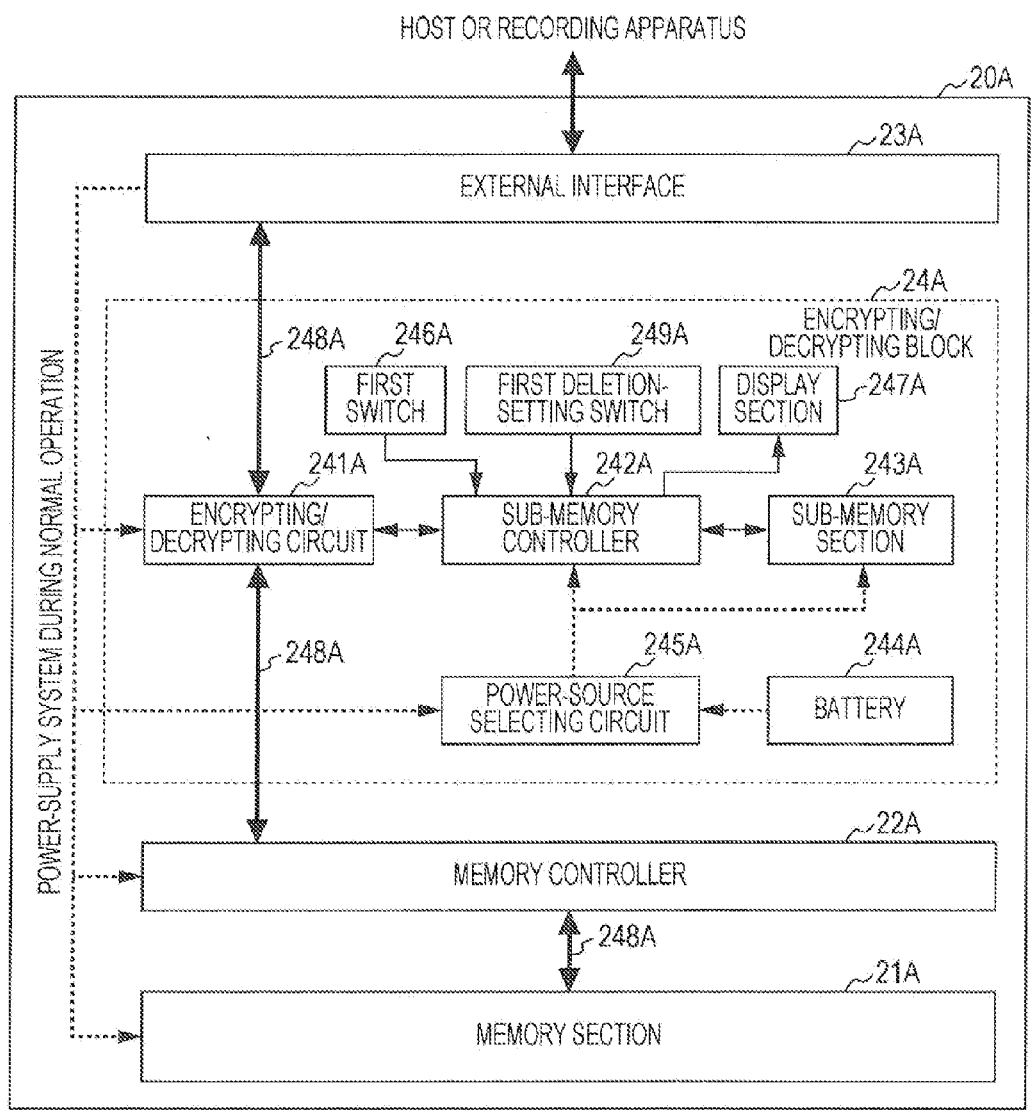
FIG. 19 is a block diagram illustrating the configuration of the storage media device in the recording system according to the third modification.

A storage media device 20A in the recording system 100A has a first deletion-setting switch 249A for manually setting whether or not key information is to be emergently deleted when a connector 25A (a connection section) of the storage media device 20A is removed from a slot section 31A in a recording apparatus 30A. The structure of the first deletion-setting switch 249A may be the same as the structure of a first switch 246A. It is, however, preferable that the first deletion-setting switch 249A and the first switch 246A can be distinguished from each other so that the other one thereof is not mistakenly operated. Other elements in the storage media device 20A are substantially the same as those of the storage media device 20 of the first embodiment. FIG. 19 illustrates the configuration of the storage media device 20A in the recording system 100A of the third modification.

The recording apparatus 30A in the recording system 100A also has a second deletion-setting switch 34A for manually setting whether or not key information is to be emergently deleted when the storage media device 20A is removed from the recording apparatus 30A. The structure of the second deletion-setting switch 34A may be the same as the structure of a second switch 33A. A change of the state of the second deletion-setting switch 34A is simultaneously transmitted to the first deletion-setting switches 249A in the storage media devices 20A, connected to the slot sections 31A, via mechanical motion or the like. That is, the recording system 100A is configured so that the second deletion-setting switch 34A provided in the recording apparatus 30A and the first deletion-setting switch 249A in each storage media device 20A connected to the connector 25A in the slot section 31A change in conjunction with each other. Other elements in the recording apparatus 30A are substantially the same as those of the recording apparatus 30 of the first embodiment.

The sub-memory controller 242A in the encrypting/decrypting block 24A detects the state of the second deletion-setting switch 34A. Upon detecting that the state of the first deletion-setting switch 249A is changed to the state for emergently deleting the key information when the connector 25A of the storage media device 20A is removed from the slot section 31A in the recording apparatus 30A, the sub-memory controller 242A sets a deletion-setting flag in a register in the sub-memory controller 242A or at a predetermined location in a sub-memory section 243A.

Next, a description will be given of an operation for emergently deleting user data stored in a memory section 21A in the storage media device 20A.

FIG. 20 is a flowchart of user-data emergency deletion processing according to the third modification.

When the connector 25A of the storage media device 20A is removed from the recording apparatus 30A, the external interface 23A (a second detecting section) in the storage media device 20A detects the removal (in step S801). As a result, the external interface 23A issues, to the sub-memory controller 242A via an encrypting/decrypting circuit 241A in the encrypting/decrypting block 24, a notification indicating that the connector 25A of the storage media device 20A is removed from the slot section 31A in the recording apparatus 30A. Upon receiving the notification, the sub-memory controller 242A checks the state of the deletion-setting flag (in step S802). Upon determining that the deletion-setting flag is set (YES in step S803), the sub-memory controller 242A performs processing for deleting the key information in the sub-memory section 243A (in step S804). Upon completion of the processing for deleting the key information in the sub-memory section 243A, the sub-memory controller 242A controls the display state of the display section 947A to visually display, to the user, that the key-information deletion, i.e., the user-data emergency deletion processing, is completed (in step S805). Lastly, the sub-memory controller 242A turns off the flag indicating that the key information is registered (in step S806). Also, when it is determined in step S803 that the deletion-setting flag is not set, the sub-memory controller 242A does nothing.

According to the third modification, the user can manually operate the first deletion-setting switch 249A in each storage media device 20A connected to the recording apparatus 30A or can operate the second deletion-setting switch 33A in the recording apparatus 30A to set the deletion-setting flags in the multiple storage media devices 20A at once. In addition, by turning on or off the deletion setting flag, the user can determine whether or not to emergently delete user data when the storage media device 20A is removed from the recording apparatus 30A, as appropriate.

For example, user data recorded in the storage media device 20A in which the deletion-setting flag is turned off is not emergently deleted when the storage media device 20A is removed from the recording apparatus 30A and is emergently deleted when the first switch 946 is operated. Conversely, user data recorded in the storage media device 20A in which the deletion-setting flag is turned on is emergently deleted when the storage media device 20A is removed from the recording apparatus 30A and is not emergently deleted when the first switch 946 is operated. With this arrangement, the user can arbitrary select one of the two operation methods for emergently deleting the user data. For example, during use when the storage media device 20A is connected to the recording apparatus 30A, the deletion-setting flag is turned on, and before use after the storage media device 20A is removed from the recording apparatus 30A, the deletion-setting flag is turned off. With this arrangement, even if the storage media device 20A is left unattended during an emergency without being removed from the recording apparatus 30A and the storage media device 20A falls into the hands of another person, there is a possibility that the user data stored therein is prevented from falling into the hands of the other person.

Fourth Modification Common to Embodiments

A configuration using a clock function in the sub-memory controller or the memory controller may also be employed. In such a case, processing for deleting the key information in the sub-memory section or the key-information storage reservation area in the memory section is performed at a predetermined time after detecting that the state of the first switch is changed to the emergency state for the user-data emergency deletion or at a preset time. When the time at which the storage media device is to be used is pre-specified, the deletion of the contents of the sub-memory section or the key-information storage reservation area in the memory section may be pre-set using a timer. With this arrangement, if the storage media device is lost, the possibility that the user data is used by another person can be reduced.

The present technology may have the following configuration.

(1) A storage media device includes:
a user-data storage section that is capable of storing encrypted user data;
a key-information storage section that is capable of storing key information for decrypting the encrypted user data;
a key-information deleting section that performs electrical processing for deleting the key information stored by the key-information storage section;
a first switch that is manually operated by a user to issue an instruction for operating the key-information deleting section;
a battery that supplies power for operating the key-information deleting section; and
a display section that displays that the key-information deletion performed by the key-information deleting section is completed.

(2) The storage media device according to configuration (1), further including:
a data input section that inputs user data;
a first encrypting section that encrypts the input user data; and
a decrypting section that decrypts the user data, read from the user-data storage section, by using the key information stored by the key-information storage section.

(3) The storage media device according to configuration (1) or (2), further including:
a power-supply selecting section that determines whether or not external power is supplied and that performs, when the external power is not supplied, switching so that the power supplied by the battery is used as power for operating the key-information deleting section.

(4) A storage media device including:
a media-device main unit that includes
a data input section that is capable of inputting user data,
a first encrypting section that encrypts the input user data,
a decrypting section that decrypts encrypted user data, read from a user-data storage section, by using key information stored by a key-information storage section, and
a first switch that is manually operated by a user to issue an instruction for operating a key-information deleting section; and a detachable memory unit that is integrally attachable to or is detachable from the media-device main unit and that includes
the user-data storage section that is capable of storing the encrypted user data,
the key-information storage section that is capable of storing the key information for decrypting the encrypted user data,
the key-information deleting section that performs electrical processing for deleting the key information stored by the key-information storage section,
a battery that supplies power for operating the key-information deleting section,
a first detecting section that detects that the detachable memory unit is detached from the media-device main unit, to perform switching so that the power supplied by the battery is used as power for operating the key-information deleting section, and
a display section that displays that the key-information deletion performed by the key-information deleting section is completed.

(5) The storage media device according to configuration (1) or (3), further including:
a connection section that is attachable to and detachable from external equipment;
a second detecting section that detects that the connection section is detached from the external equipment, to operate the key-information deleting section; and
a first deletion-setting switch that is manually operated by the user to turn on or turn off the operation of the key-information deleting section on the basis of a result of the detection performed by the second detecting section.

The present disclosure contains subject matter related to that disclosed in Japanese Priority Patent Application JP 2011-074797 filed in the Japan Patent Office on Mar. 30, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A storage media device comprising:
a user-data storage section that is capable of storing encrypted user data;
a key-information storage section that is capable of storing key information for decrypting the encrypted user data;
a key-information deleting section that performs electrical processing for deleting the key information stored by the key-information storage section;
a first switch that is manually operated by a user to issue an instruction for operating the key-information deleting section;
a battery that supplies power for operating the key-information deleting section when a detachable memory unit of the storage media device is detached from the storage media device; and
a display section that displays that the key-information deletion performed by the key-information deleting section is completed.

2. The storage media device according to claim 1, further comprising:
a data input section that inputs user data;
a first encrypting section that encrypts the input user data; and a decrypting section that decrypts the encrypted user data, read from the user-data storage section, by using the key information stored by the key-information storage section.

3. The storage media device according to claim 2, further comprising:
a power-supply selecting section that determines whether or not external power is supplied and that performs, when the external power is not supplied, switching so that the power supplied by the battery is used as power for operating the key-information deleting section.

4. The storage media device according to claim 1, further comprising a first detecting section that detects that the detachable memory unit is detached from the storage media device.

5. The storage media device according to claim 1, wherein the storage media device is removably connected to a recording apparatus.

6. A storage media device comprising:
a media-device main unit that comprises:
a data input section that is capable of inputting user data,
a first encrypting section that encrypts the input user data,
a decrypting section that decrypts the encrypted user data, read from a user-data storage section, by using key information stored by a key-information storage section, and
a first switch that is manually operated by a user to issue an instruction for operating a key-information deleting section; and
a detachable memory unit that is integrally attachable to or is detachable from the media-device main unit and that comprises:
the user-data storage section that is capable of storing the encrypted user data,
the key-information storage section that is capable of storing the key information for decrypting the encrypted user data,
the key-information deleting section that performs electrical processing for deleting the key information stored by the key-information storage section,
a battery that supplies power for operating the key-information deleting section,
a first detecting section that detects that the detachable memory unit is detached from the media-device main unit,
a power-supply selecting section to perform switching of power supply source so that power supplied by the battery is used for operating the key-information deleting section when the detachable memory unit of the storage media device is detached from the media-device main unit, and
a display section that displays that the key-information deletion performed by the key-information deleting section is completed.

7. The storage media device according to claim 6, further comprising:
a connection section that is attachable to and detachable from an external equipment;
a second detecting section that detects that the connection section is detached from the external equipment; and
a first deletion-setting switch that is manually operated by the user to turn on or turn off an operation of the key-information deleting section, wherein the second detecting section operates the key-information deleting section on a basis of a result of the detection performed by the second detecting section and a state of the first deletion-setting switch.

8. The storage media device according to claim 6, further comprising a connection section that is attachable to and detachable from an external equipment.

9. The storage media device according to claim 6, wherein the storage media device is removably connected to a recording apparatus.

10. A recording apparatus comprising:
one or more slot sections to which one or more storage media devices are removably connected, wherein each of the one or more storage media devices comprises a battery that supplies power for electrical processing for deleting a key information when a detachable memory unit of each of the one or more storage media devices is detached from the one or more storage media devices;
a control section that supplies user data to the one or more connected storage media devices; and
a second switch that is manually operated by a user and that operates mechanically in conjunction with a first switch in the one or more connected storage media devices, wherein the first switch is manually operated by the user to issue an instruction for deleting the key information.

11. The recording apparatus according to claim 10, wherein the control section comprises an encrypting section that encrypts the user data to be supplied to the one or more connected storage media devices.

12. The recording apparatus according to claim 10, wherein the control section comprises a data input section that inputs the user data.

13. The recording apparatus according to claim 10, wherein the control section comprises a decrypting section that decrypts the user data, by using the key information.

14. The recording apparatus according to claim 10, wherein each of the one or more storage media devices further comprises a first detecting section that detects that the detachable memory unit is detached from the one or more storage media devices.

15. The recording apparatus according to claim 10, wherein each of the one or more storage media devices further comprises a power supply selecting section that determines whether or not external power is supplied and that performs, when the external power is not supplied, switching so that the power supplied by the battery is used as power for electrical processing for deleting the key information.

16. The recording apparatus according to claim 10, further comprising a display section to display that the key information deletion is completed.

17. A recording apparatus comprising:
one or more storage media devices removably connected to the recording apparatus, wherein each of the one or more storage media devices comprises:
a first detecting section that detects that a detachable memory unit of each of the one or more storage media devices is detached from the one or more storage media devices; and
a battery that supplies power for electrical processing for deleting a key information when the detachable memory unit of each of the one or more storage media devices is detached from the one or more storage media devices;
a control section that supplies user data to the one or more connected storage media devices; and
a second deletion-setting switch that is manually operated by a user and that operates mechanically in conjunction with a first deletion-setting switch in each of the one or more connected storage media devices, wherein the first deletion-setting switch is manually operated by the user to turn on or turn off the electrical processing for deleting the key information.

* * * * *